United States Patent
Nakano et al.

(10) Patent No.: US 9,263,717 B2
(45) Date of Patent: Feb. 16, 2016

(54) BATTERY PACK

(71) Applicant: Sanyo Electric Co., Ltd., Moriguchi, Osaka (JP)

(72) Inventors: Masaya Nakano, Sumuto (JP); Osamu Inaoka, Sumuto (JP); Takao Takatsu, Sumuto (JP); Haruhiko Yoneda, Sumuto (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 430 days.

(21) Appl. No.: 13/675,002

(22) Filed: Nov. 13, 2012

(65) Prior Publication Data
US 2013/0136956 A1 May 30, 2013

(30) Foreign Application Priority Data

Nov. 25, 2011 (JP) .................................. 2011-257379

(51) Int. Cl.
*H01M 2/10* (2006.01)
*H01M 2/20* (2006.01)
*H01M 2/30* (2006.01)

(52) U.S. Cl.
CPC ............ *H01M 2/105* (2013.01); *H01M 2/1055* (2013.01); *H01M 2/204* (2013.01); *H01M 2/30* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2010/0073005 A1* | 3/2010 | Yano et al. | 324/427 |
| 2010/0156350 A1 | 6/2010 | Murayama et al. | |
| 2011/0253402 A1 | 10/2011 | Aradachi et al. | |
| 2012/0045665 A1* | 2/2012 | Park | 429/7 |
| 2012/0208048 A1 | 8/2012 | Ogura et al. | |

FOREIGN PATENT DOCUMENTS

| | | |
|---|---|---|
| EP | 2 280 436 | 2/2011 |
| JP | 2001-229895 | 8/2001 |
| JP | 2004-236450 | 8/2004 |
| JP | 2008-236882 | 10/2008 |
| JP | 2010-146879 | 7/2010 |
| JP | 2012-169105 | 9/2012 |

OTHER PUBLICATIONS

Extended European Search Report issued Mar. 22, 2013 in corresponding European patent application No. 12 19 3290.

* cited by examiner

*Primary Examiner* — Patrick Ryan
*Assistant Examiner* — Carmen Lyles-Irving
(74) *Attorney, Agent, or Firm* — Wenderoth, Lind & Ponack LLP

(57) ABSTRACT

A battery pack detachably mounted in a device for supplying power to the device to operate the device includes at least one rechargeable secondary battery (1), a battery case (31) housing the rechargeable secondary battery (1), a mounting mechanism for mechanically mounting the battery case (31) in the device, an electrical connection connected electrically to the device for supplying power to the device, and a pack circuit board (74) securing the electrical connection. The battery case (31) is divided into a first casing and a second casing, the pack circuit board (74) is secured to the inside surface of the first casing, and the mounting mechanism is installed so the mounting mechanism is at least partially exposed on the surface of the first casing.

9 Claims, 34 Drawing Sheets

Fig. 19
(a)
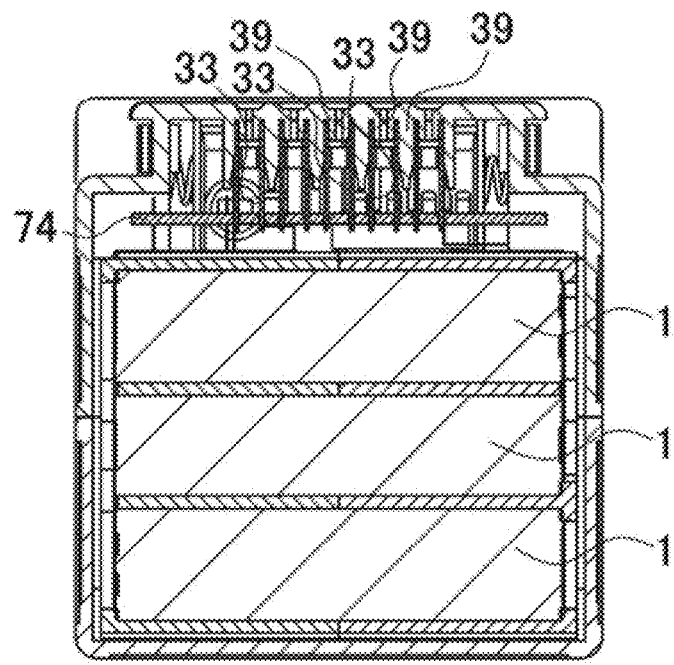
(b)
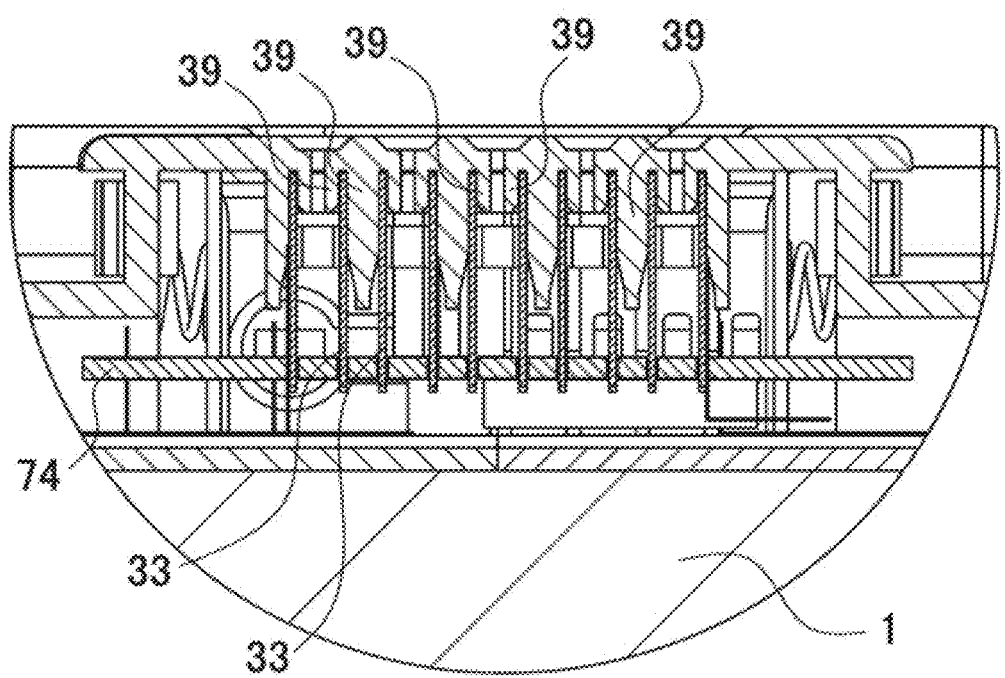

BATTERY PACK

FIELD OF THE INVENTION

The present invention relates to a battery pack detachably installed in a battery-powered device such as a power tool, an electric lawn mower, or an electric blower to supply electric power.

BACKGROUND

A battery-powered device such as a power tool can be used cordlessly, for example, at a construction site, when a detachable battery pack containing rechargeable batteries is provided. When the battery pack in the battery-powered device is removable, the removable battery pack can be repeatedly recharged and reused. When the remaining capacity of a battery pack is low, the battery pack can be placed in a battery pack charger and recharged.

An example of such a battery pack is shown in FIG. 31 through FIG. 33. FIG. 31 is a perspective view showing a battery pack 30X of the prior art installed in a battery pack charger. FIG. 32 is a perspective view showing a battery pack 30X of the prior art installed in a power tool PT. FIG. 33 is a perspective view of the battery pack 30X in FIG. 31. A battery pack 30X with very little remaining capacity is placed in a battery pack charger 100 as shown in FIG. 31 and then recharged. When the charging has been completed, the battery pack is removed from the battery pack charger 100 and placed in a power tool PT as shown in FIG. 32 to provide power. Here, the battery pack 30X is detachably mounted in the battery pack charger 100 and the power tool PT. For this, as shown in the perspective view of FIG. 33, the battery pack 30X has an engaging hook 54X and a detachment unit 52X. The engaging hook 54X keeps the battery pack 30X from detaching when it has been attached to a battery pack charger or power tool PT. In the battery pack charger 100 in FIG. 31 and the power tool PT in FIG. 32, an engaging recess 17X is formed to engage the engaging hook 54X in a position corresponding to the engaging hook 54X in the attached battery pack 30X. In the example shown in FIG. 33, the engaging hook 54X is biased so as to protrude downward from the battery pack 30X. In this way, the engaging hook 54X on a battery pack 30X set in the battery pack charger 100 in FIG. 31 or the power tool PT in FIG. 32 is engaged in the engaging recess 17X and secured.

The engaging hook 54X is linked to the detachment unit 52X, and the user manually lifts up the detachment unit 52X to retract the detachment unit 52X into the battery pack 30X in the housing direction. A recess is provided in the detachment unit 52X to make it easier for the user to operate. When the user manually operates the detachment unit 52X, the biased engaging hook 54X is pushed out in the protruding direction from the battery pack 30X. In this way, the engaging hook 54X keeps the battery pack 30X from coming out when attached to a battery pack charger 100 or power tool PT.

It also establishes an electrical connection to supply power from the battery pack to a battery-operated device and exchange various types of signals when the battery pack is mounted in a battery-operated device. An electrical connection is usually achieved by inserting and clamping an electrical contact such as a connector or external connection terminal to maintain a connection.

In a structure for mounting a battery pack in a battery-powered device, an electrical connection has to be established when the battery pack is physically and mechanically mounted in the battery-operated device. The mechanical connection structure can be an engaging hook provided in a latching unit, and the electrical connection can be performed via a connector or external connection terminal. Separating the mechanical connection structure from the electrical connection structure can improve the mechanical connection strength while also improving the stability and reliability of the electrical connection.

For example, see Japanese Laid-open Patent Application No. 2008-236882; and Japanese Laid-open Patent Application No. 2004-236450.

SUMMARY

However, when the mechanical connection structure and the electrical connection structure are separated in this way, the two have to be properly positioned with respect to each other. In other words, even when a mechanical linkage is performed, the electrical connection may be misaligned. As a result, contact is unstable or an electrical connection is not obtained. On the other hand, when the focus is placed on the electrical connection but a proper mechanical structure is not obtained, a stable linkage is not realized. Therefore, it is important to position the electrical connection structure and the mechanical connection structure in the design of the battery pack in order to be able to achieve proper connection of both.

However, as shown in the cross-sectional view of FIG. 34, when the battery pack includes a battery holder 70Y storing secondary batteries 1, and a pack circuit board 74Y mounted on top of the battery holder 70Y inside a battery case divided in two horizontally, the battery pack has a plurality of components. Because of errors in the positioning of these components and manufacturing tolerances during the manufacture of these components, it is difficult to improve positioning accuracy. Manufacturing costs would rise significantly if the manufacture and mounting precision of these components were increased. For example, in FIG. 34, an engaging hook 54X is provided on the upper casing 31AY side as a mechanical connection structure for physically connecting the battery pack to an external battery-powered device, and a connector 13Y is fixed to the pack circuit board 74Y to establish an electrical connection. The pack circuit board 74Y is mounted on the battery holder 70Y, and the battery holder 70Y is mounted in the lower casing 31BY. As a result, there is an error between the mechanical connection position of the engaging hook 54X in the upper casing 31AY and the electrical connection position of the connector 13Y. As indicated by the cross-hatching in FIG. 34, cumulative connection errors occur in four spots: where the connector 13Y is mounted on the pack circuit board 74Y, where the pack circuit board 74Y is mounted on the battery holder 70Y, where the battery holder 70Y is mounted in the lower casing 31BY, and where the lower casing 31BY is mounted in the upper casing 31AY. When the manufacturing tolerances for the various components are added to this, it can be very difficult to reliably position the electrical connections and mechanical connections.

The present invention has been devised in view of the problem associated with the prior art. The main purpose of the present invention is to provide a battery pack able to improve, using a simple configuration, mechanical and electrical connection precision so the battery pack is properly connected, both mechanically and electrically, to a battery-powered device.

In order to achieve this purpose, the first aspect of the present invention is a battery pack detachably mounted in a battery-powered device for supplying power to the battery-powered device to operate the device including at least one rechargeable secondary battery 1, a battery case 31 housing the secondary battery 1, a mounting mechanism for mechanically mounting the battery case 31 in the battery-powered device, an electrical connection connected electrically to the battery-powered device for supplying power to the battery-powered device, and a pack circuit board 74 securing the electrical connection. The battery case 31 is divided into a first casing and a second casing, the pack circuit board 74 is secured to the inside surface of the first casing, and the mounting mechanism is installed so that the mounting mechanism is at least partially exposed on the surface of the first casing. This configuration can be used to secure the pack circuit board on the first casing side, and to position the first casing relative to the mechanical connections structure and electrical connection structures by placing the connection structures to the battery-operated device on the first casing side. In other words, when the battery pack is connected electrically to an external battery-powered device via electrical connections, the electrical connections fixed to the pack circuit board can be positioned in the proper positions in the first casing. Meanwhile, the mechanical connections between the battery pack and the battery-operated device are performed using a mounting mechanism provided on the first casing side. Because the relative positions of the electrical connections and the mechanical connections are determined by the first casing, the number of connection errors can be greatly reduced, and the electrical connections and mechanical connections can be properly positioned using an inexpensive configuration.

The second aspect of the present invention is a battery pack in which the first casing has a column-shaped portion 36 protruding from the inside in an erect position and an insertion pin 36a protruding from an edge of the column-shaped portion 36, the pack circuit board 74 has a boss hole 76 formed in a position corresponding to the insertion pin 36a in a position secured on the inside of the first casing, and the pack circuit board 74 is positioned with the first casing by inserting the insertion pin 36a of the column-shaped portion 36 into the boss hole 76. This configuration can be used to easily position the pack circuit board on the inside of the first casing.

The third aspect of the present invention is a battery pack in which a battery holder 70 is provided having a plurality of battery housing spaces for individually housing a secondary battery 1, a boss 72 for securing the pack circuit board 74 is provided in the upper surface of the battery holder 70, the boss 72 being provided in a position corresponding to the insertion pin 36a with the battery holder 70 housed in the battery case 31, a pin coupling unit 73 is formed in the end surface of the boss 72 to couple with the insertion pin 36a, and the pack circuit board 74 is interposed between the pin coupling unit and the insertion pin 36a by coupling the insertion pin 36a with the pin coupling unit when the insertion pin 36a has been inserted into the boss hole 76 of the pack circuit board 74. This configuration can be used to interpose and secure the pack circuit board between the first casing and the battery holder and, unlike the prior art, to secure the pack circuit board without requiring screws.

The fourth aspect of the present invention is a battery pack in which an electrical connection holder 14 for holding the electrical connection is provided on the inside of the first casing. In this configuration, the electrical connection can be held on the inside of the first casing by the holder, and the position of the electrical connection can be positioned more precisely relative to the first casing.

The fifth aspect of the present invention is a battery pack in which the electrical connection is a connector 13 having a frame-shaped profile, and the electrical connection holder 14 is clamping ribs clamping both sides of the connector 13. In this configuration, the connector can be clamped by clamping ribs from both sides on the inside of the first casing, and the electrical connection can be properly positioned using a simple configuration.

The sixth aspect of the present invention is a battery pack in which the electrical connection is an external connection terminal 33 that is a bent metal plate, and the electrical connection holder 14 is a terminal positioning rib 39 clamping the upper edge of the external connection terminal 33. In this configuration, the position of the external connection terminal that is a bent metal plate can be positioned properly on the inside of the first casing and the upper edge can be held to keep an external connection terminal that is a bent metal plate from sagging.

The seventh aspect of the present invention is a battery pack in which the mounting mechanism is an engaging hook 54 protruding from the first casing, and inserted into a holding recess 17 formed in a battery-powered device to engage the holding recess. In this configuration, the battery pack can be connected mechanically to the battery-operated device using a simple structure in which an engaging hook engages a holding recess.

The eighth aspect of the present invention is a battery pack in which the mounting mechanism is a detachment unit 52 for switching the engaging hook 54 to a locked position protruding from the first casing or to an unlocked position housed inside the first casing. In this configuration, the detachment unit can be operated to easily release the mechanical connection between the battery pack and the battery-operated device.

The ninth aspect of the present invention is a battery pack in which the mounting mechanism is a latching unit 50, 50B having an integrally formed engaging hook 54 and detachment unit 52, in which the detachment unit 52 is slidably exposed on a surface of the first casing in a position other than that of the protruding engaging hook 54, and the engaging hook 54 is exposed on the surface of the first casing by sliding the detachment unit 52. In this configuration, the detachment unit can be slid to switch the engaging hook between protruding and being housed, and the battery pack can be easily attached to or detached from the battery-operated device.

BRIEF DESCRIPTION OF THE DRAWINGS

The description herein makes reference to the accompanying drawings wherein like reference numerals refer to like parts throughout the several views, and wherein:

FIG. 19 (a) is a horizontal cross-sectional view of the battery pack in a variation, and FIG. 19 (b) is an enlarged cross-sectional view of FIG. 19 (a);

DETAILED DESCRIPTION

Figure 1:
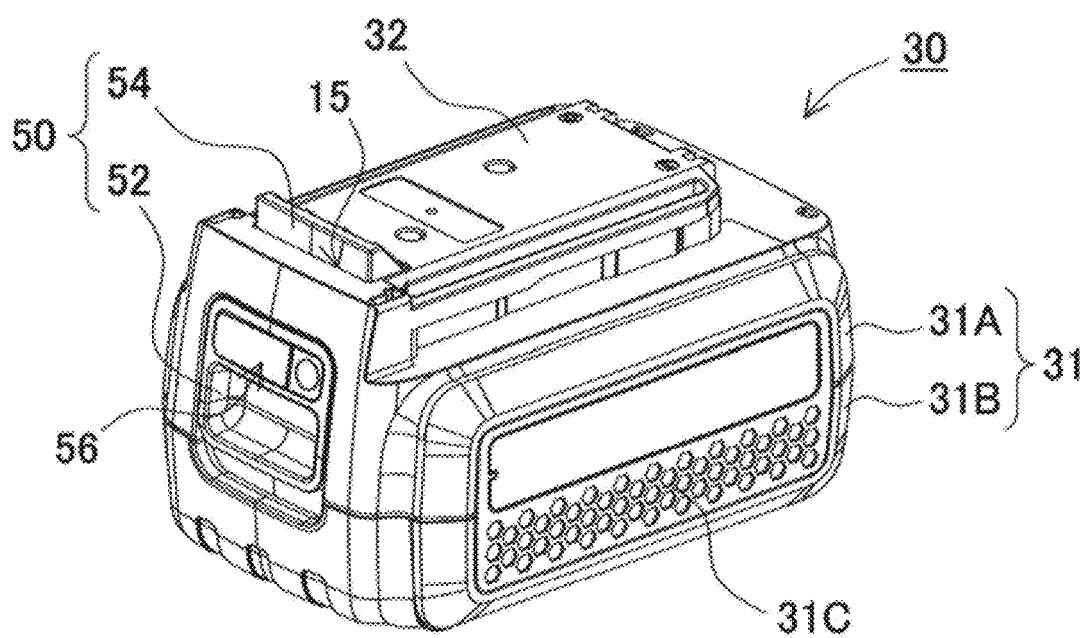
FIG. 1 is a perspective view showing a battery pack.

The following is an explanation of embodiments of the present invention with reference to the drawings. The embodiments described below are used to illustrate a battery pack realizing the technical concepts of the present invention. The present invention is not specific to the battery pack described below. Also, the components described in the claims are not specific to the components in the embodiments. The dimensions, materials, shapes and relative arrangement of the configurational elements described in the embodiments, unless otherwise indicated, do not limit the scope of the present invention and serves merely as an explanatory example. The sizes and relative positions of the components shown in the drawings may be exaggerated for illustrative purposes. In the following explanation, identical or similar components are indicated by the same name and are denoted by the same reference number. A detailed explanation is omitted where appropriate. A plurality of elements constituting the present invention may be combined into a single element, or a plurality of elements may work together as a single element. Conversely, the function of a single element may be divided and realized using a plurality of elements. Also, details described in one embodiment or example may be applied to another embodiment or example.

Example 1

Figure 2:
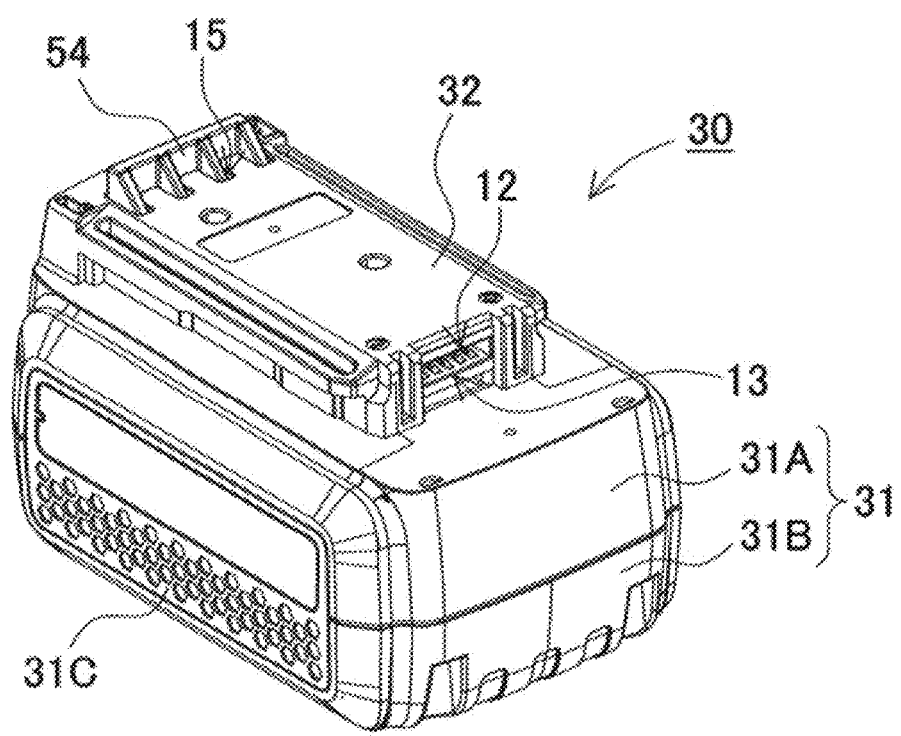
FIG. 2 is a perspective view showing a rear view of the battery pack in FIG. 1.
Figure 3:
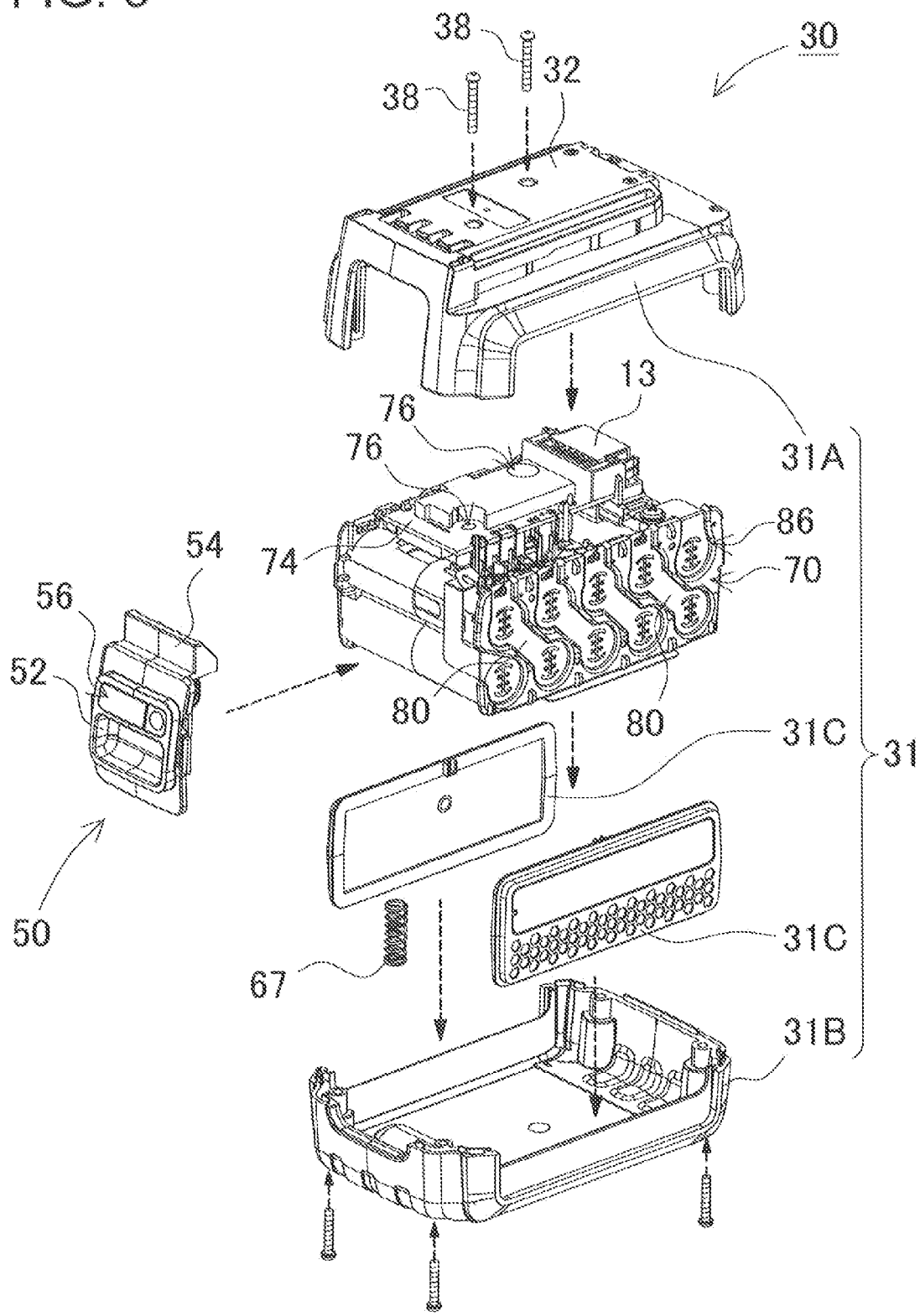
FIG. 3 is an exploded perspective view of the battery pack from the position in FIG. 1.
Figure 4:
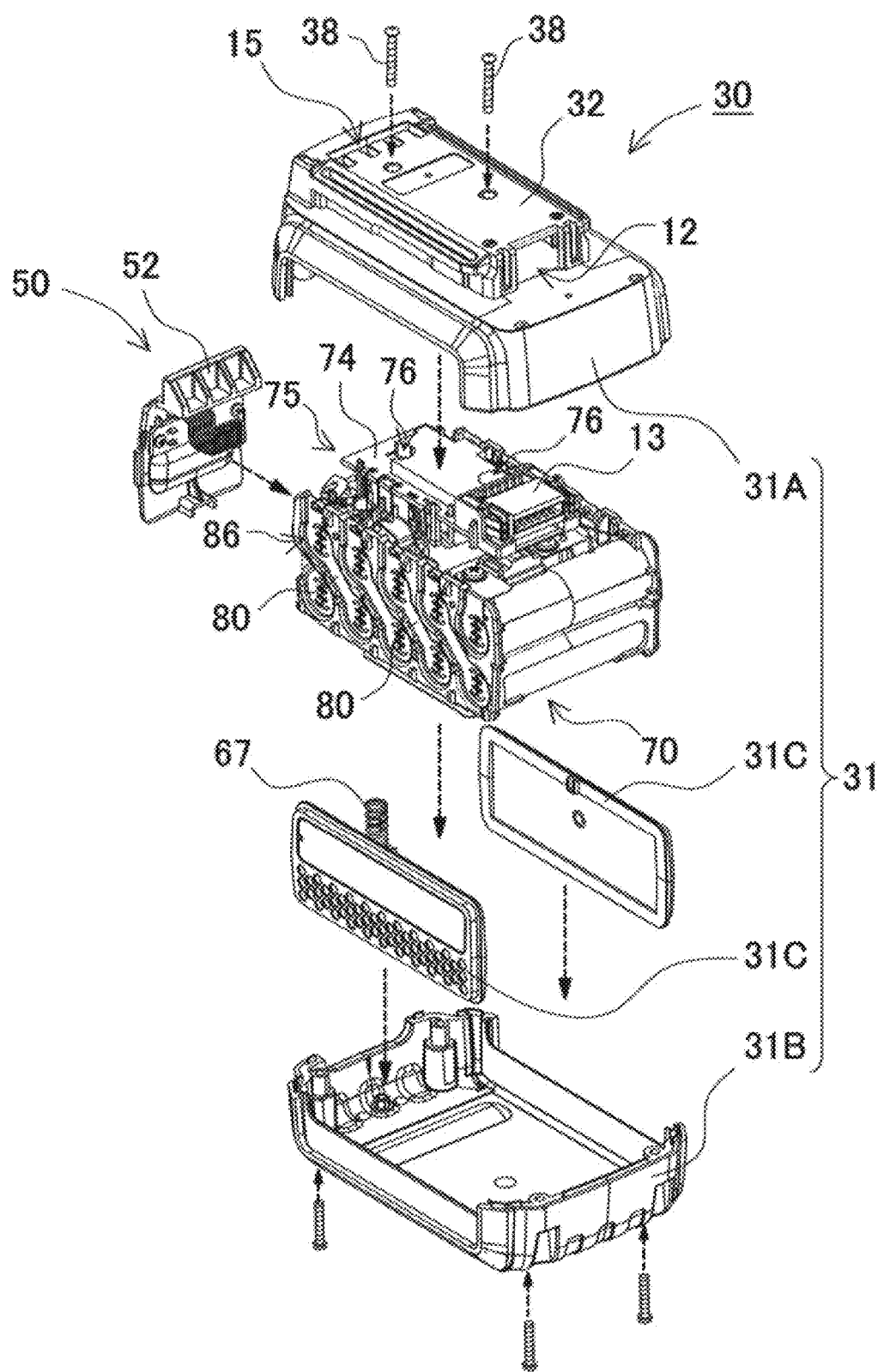
FIG. 4 is an exploded perspective view of the battery pack from the position in FIG. 2.

FIG. 1 through FIG. 4 show a battery pack for a power tool which is the battery pack in the first embodiment of the present invention. FIG. 1 is a perspective view showing a battery pack 30, FIG. 2 is a perspective view showing a rear view of the battery pack 30 in FIG. 1, FIG. 3 is an exploded perspective view of the battery pack 30 from the position in FIG. 1, and FIG. 4 is an exploded perspective view of the battery pack 30 from the position in FIG. 2. The following is an explanation of a battery pack for a power tool. However, the battery pack of the present invention is not limited to battery packs for power tools. The present invention can be adapted for use in any other type of battery-powered device.

The battery pack 30 in these drawings has a box-like profile and contains secondary batteries 1. More specifically, the battery pack 30 includes a battery holder 70 for housing a plurality of rechargeable secondary batteries 1, battery lead plates 80 connected to the secondary batteries 1 on their end faces, a pack circuit board 74 on which a protection circuit for the secondary batteries 1 has been mounted, a plurality of external connectors connected to the battery-operated device or battery pack charger 100, and a battery case 31 housing the battery holder 70 and the pack circuit board 74.

(Battery Case 31)

As shown in FIG. 1 and FIG. 2, the battery case 31 has a box-like profile with rounded corners. The external connectors protrude from the surface 32 to connect the case to the connection terminals (not shown) of a battery-operated device such as a power tool PT or a battery pack charger 100. In the example shown in FIG. 2 and FIG. 4, an exposure window 12 is formed in a portion of the upper casing 31A constituting the battery case 31 for exposing the electrical connections. The portion of the electrical connections connected to the connection terminals of the battery pack charger or battery-operated device is exposed via the exposure window 12. A latching unit 50 is also provided to hold the battery pack 30 in place when mounted in a power tool PT or battery pack charger 100. The battery case 31 is molded from a resin with superior insulating properties and strength.

As shown in the exploded perspective views of FIG. 3 through FIG. 4, the battery case 31 is divided in half into a first casing and a second casing. A storage space is configured inside the battery case 31 for housing the battery holder 70, the pack circuit board 74, and the latching unit 50.

(Side Cover 31C)

Figure 5:
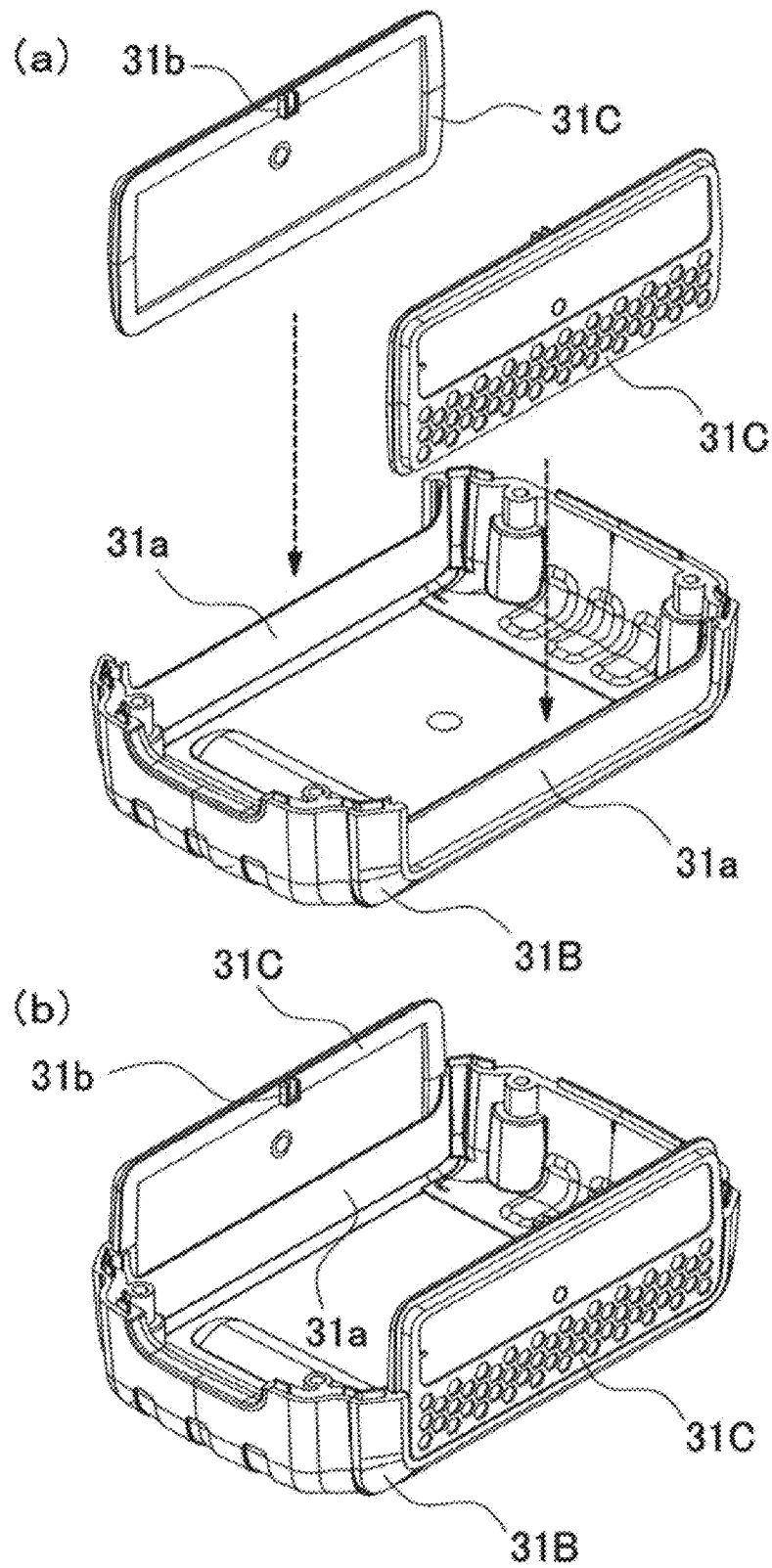
FIG. 5 (*a*) is a perspective view showing the side covers being installed in the lower casing, and FIG. 5 (*b*) is a perspective view showing the side covers installed in the lower casing subsequent to the position shown in FIG. 5 (*a*)

The sides of the battery case 31 are covered by side covers 31C. FIG. 5 (a) is a perspective view showing the side covers 31C being installed in the lower casing 31B, and FIG. 5 (b) is a perspective view showing the side covers 31C installed in the lower casing 31B subsequent to the position shown in FIG. 5 (a). As shown in these drawings, the side covers 31C are combined as separate components with the upper casing 31A and the lower casing 31B. The edges of the side covers 31C are inserted into grooves provided in the upper casing 31A and the lower casing 31B, and are interposed between and secured by the upper casing 31A and the lower casing 31B.

(Warp-Preventing Ribs 31a)

Figure 6:
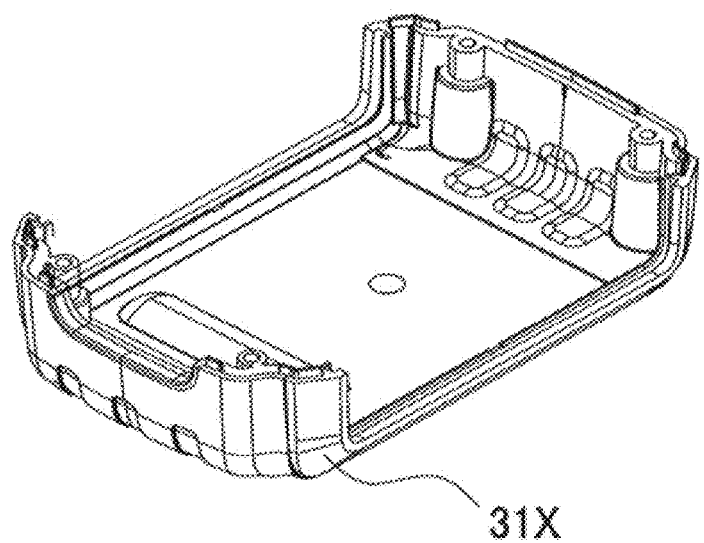
FIG. 6 is a perspective view from the side showing a battery case of the prior art as a separate component.

Warp-preventing ribs 31a are provided in the lower casing 31B. As shown in the lower casing 31X of FIG. 6, the side surfaces of a battery case of the prior art are separate components. An opening is formed to mount the side surfaces, and a shape is used which reduces the number of resin molded components required. However, this structure sometimes becomes warped when the battery case is resin-molded. The mechanical strength is also weaker in the torsional direction. Here, as shown in FIG. 5 (a), the portion covered by the side covers 31C is not completely open. Instead, warp-preventing ribs 31a are provided. These are able to prevent warping of the battery case. The side surfaces, the warp-preventing ribs 31a, and the side covers 31C form a double structure with improved mechanical strength. When a power tool is used outdoors, it is subjected to rough handling. It is often dropped and sustains other shocks. The increased mechanical strength can make the battery pack more reliable when used in such a power tool.

In this example, warp-preventing ribs 31a are provided only in the lower casing 31B. However, the warp-preventing ribs can be provided on the upper casing side, or warp-preventing ribs can be provided on both the upper casing and the lower casing side.

Because these side covers 31C are separate components, the side covers 31C can be easily changed. As a result, decorative panels can be used as side covers 31C to change the design of the battery pack 31 and enhance esthetic appeal. In the example shown in FIG. 5 (b), the surface of the side cover 31C has a simple frame design in the upper half, and hexagonal dimples have been formed in the lower half.

(Wrong Insertion-Preventing Ribs 31b)

Figure 7:
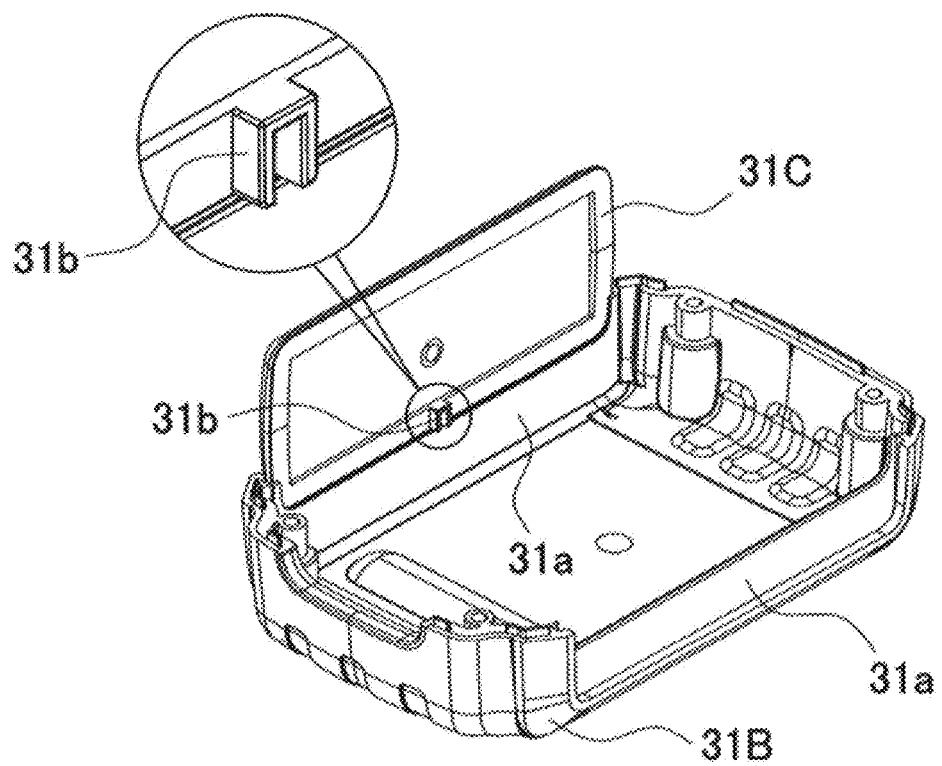
FIG. 7 is a perspective view showing a side cover about to be inserted in the opposite direction in the battery case of FIG. 5.
Figure 8:
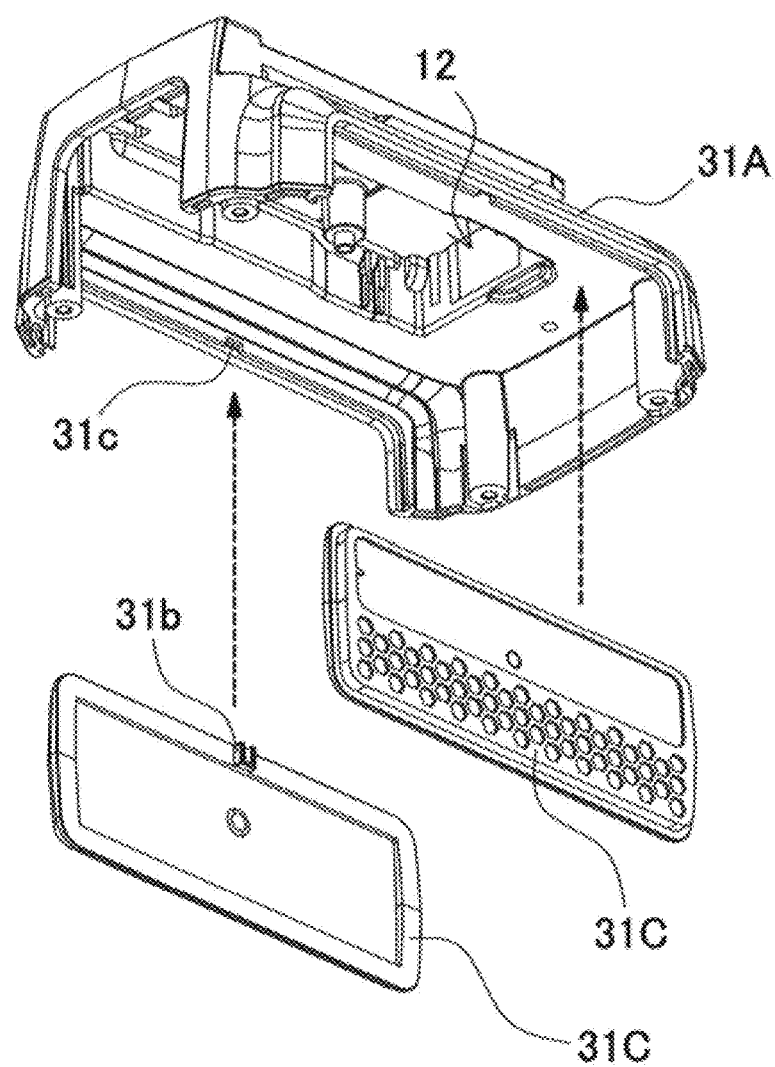
FIG. 8 is a perspective view from below showing the side cover being installed in the upper casing.

When the side cover 31C has an asymmetrical design, the side cover 31C may be inserted upside down or right-side up during assembly. As a result, the design on the side covers 31C may not be displayed as intended, and the product may be defective. In this embodiment, as shown in FIGS. 5 (a), (b), FIG. 7, and FIG. 8, wrong insertion-preventing ribs 31b are provided on the side covers 31C. A wrong-insertion rib 31b is provided on the edge of the backside of the side cover 31C. In the example shown in FIG. 5 (a), the ribs are provided in the middle on the upper edge of the side cover 31C. The wrong insertion-preventing ribs then protrude from the backside of the side cover 31C. As a result, when a side cover 31C is inserted the wrong way in the lower casing 31B as shown in FIG. 7, the wrong insertion-preventing ribs 31b come in contact with the warp-preventing rib 31a, and continued insertion becomes impossible. Thus, it is physically impossible to insert the side cover 31C the wrong way, and assembly mistakes are avoided. As shown in the exploded perspective view of FIG. 8, a rib guide 31c is also provided on the upper casing 31A to guide the wrong insertion-preventing ribs 31b to the proper position for the wrong insertion-preventing ribs 31b when the side cover 31C is inserted. In this way, the side covers 31C are positioned properly and can be inserted into the upper casing 31A.

In this example, as mentioned above, warp-preventing ribs are not provided on the upper casing 31A. This keeps the wrong insertion-preventing ribs 31b from making contact with the warp-preventing ribs. However, when warp-preventing ribs are provided in the upper casing, the shape of the wrong insertion-preventing ribs can be changed so that they can be inserted properly into the upper casing. For example, a slit can be provided in the warp-preventing ribs of the upper casing so that the wrong insertion-preventing ribs can be guided into the central portion of the upper casing. The shape, position and number of wrong insertion-preventing ribs can be changed as desired. They can have any shape or structure that allows for proper insertion of the side covers in the battery case and that prevents improper insertion of the side covers in the battery case.

(Battery Holder 70)

As shown in FIG. 3 and FIG. 4, the battery holder 70 includes secondary batteries 1, a pack circuit board 74, battery lead plates 80, and different types of lead wires. As shown in the exploded perspective view of FIG. 9, the battery holder 70 is also provided with a battery storage space for storing secondary batteries 1 on the lower surface, and a circuit board securing portion 75 for securing the pack circuit board 74 on the upper surface. The secondary batteries 1 are connected to the battery lead plates 80 on the end faces of the secondary batteries 1 exposed by the exposed portion in the end face of the battery holder 70, and the outputs of the battery core housing the secondary batteries 1 in the battery holder 70 is connected to the pack circuit board 74 via an output lead plate and an output lead wire. Charge/discharge terminals are provided on the pack circuit board 74 to connect the output of the battery core to the power tool PT or battery pack charger 100. A lead plate securing frame 86 is provided on the side surface of the battery lead plates 80 to secure each battery lead plate 80.

Figure 22:
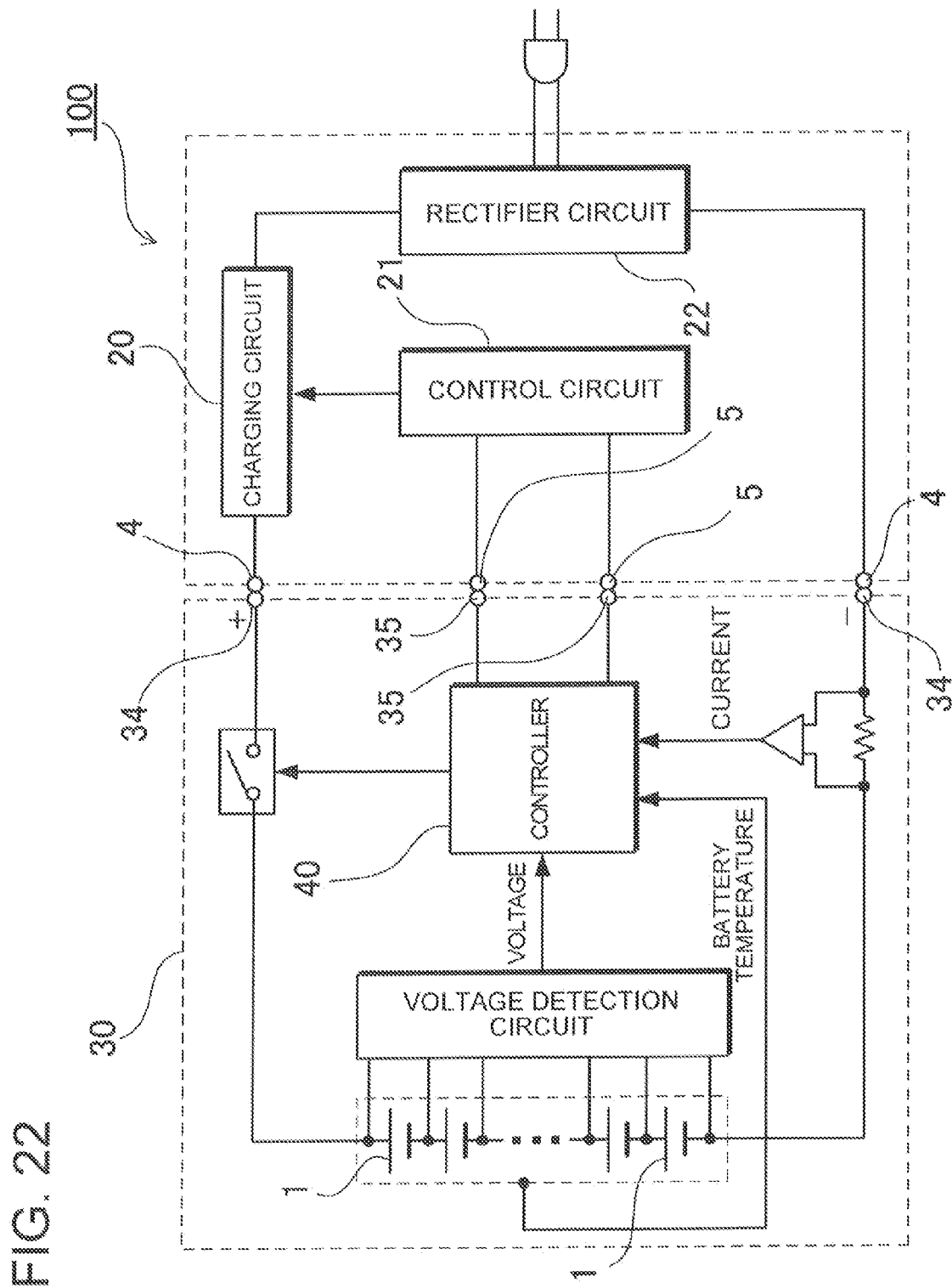
FIG. 22 is a circuit diagram showing the battery pack connected to a battery pack charger.

A protective circuit for the secondary batteries 1 is mounted on the pack circuit board 74. The protective circuit is connected via battery lead plates 80 and a signal lead wire 84 to detect the voltage of each secondary battery 1. One end of the connector 13 serving as the electrical connection is secured to the pack circuit board 74. In addition to the charge/discharge terminals 34 connected to the outputs of the secondary batteries 1 stored in the battery pack, the connector 13 has a signal terminal 35 for output from the protective circuit and output such as battery information (FIG. 22). As shown in FIG. 2, the connected portion of the connector 13 is exposed to the outside via the exposure window 12 formed in the battery case 31. The battery-powered device and battery pack charger is connected electrically to the battery pack by inserting the connection terminal into the connector 13 exposed via the exposure window 12.

(Secondary Batteries 1)

The battery case 31 is molded into a shape able to store secondary batteries 1 inside. Here, the secondary batteries 1 are cylindrical storage batteries in which the cylindrical outer canister is arranged in the longitudinal direction. As shown in FIG. 4, the battery case 31 includes a plurality of secondary batteries 1 arranged side-by-side on the same plane so as to be parallel to each other inside the battery case 31. The secondary batteries 1 housed inside the battery pack 30 are lithium-ion batteries. However, the secondary batteries can be any other type of rechargeable battery, including nickel-metal hydride batteries, nickel-cadmium batteries, and polymer batteries. The secondary batteries can be connected in series to increase the output voltage, or connected in parallel to increase the output current. In this example, the secondary batteries 1 are lithium-ion batteries, five pairs of batteries arranged in parallel are connected in series, and the output voltage is 18 V. However, there are no restrictions on the number of secondary batteries or their connection arrangement. The battery pack can be designed freely based on the type of battery-operated device being used, the intended use of the battery-operated device, and the number of secondary batteries and the output voltage being used.

(Battery Storage Space)

Figure 9:
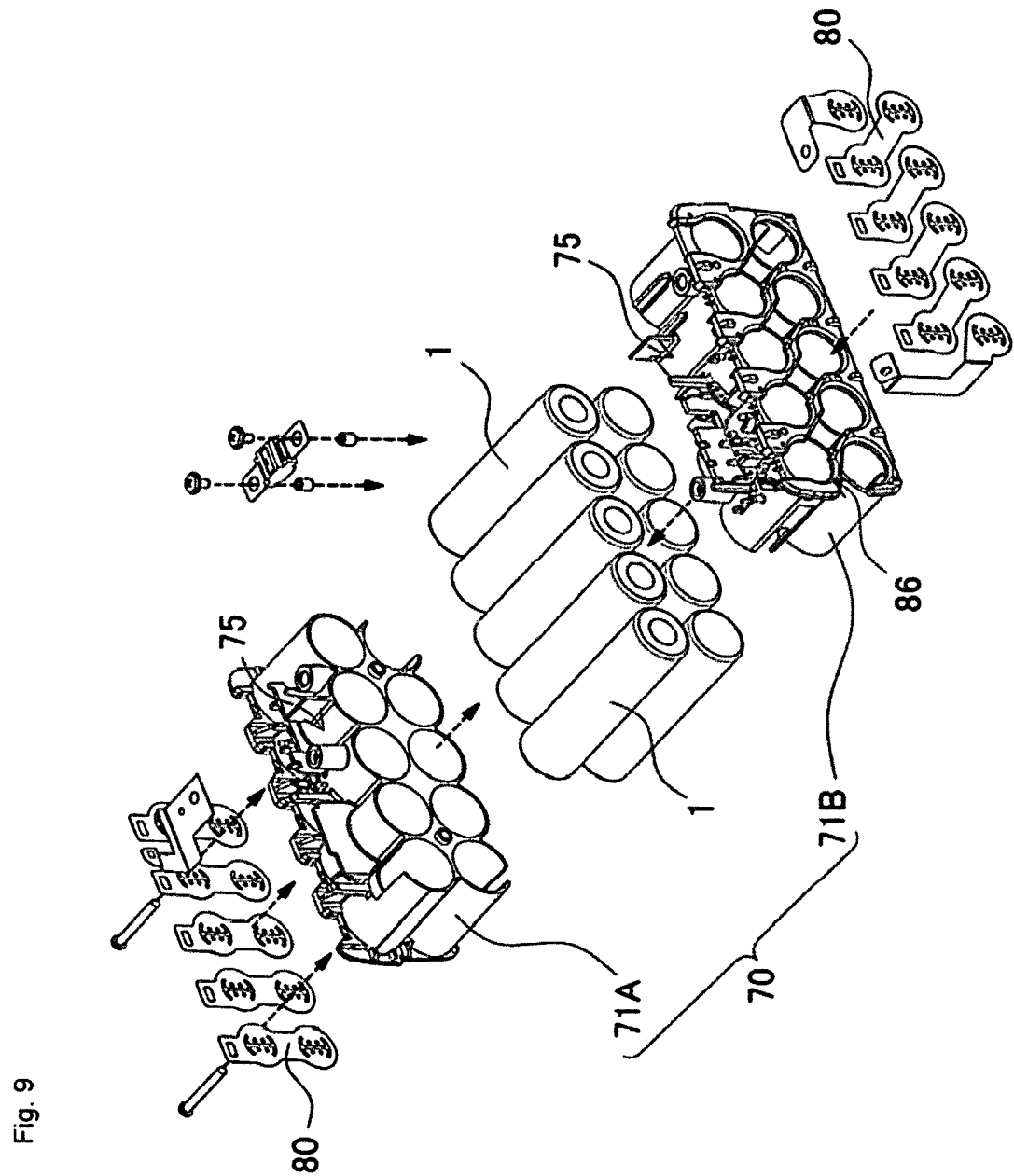
FIG. 9 is an exploded perspective view of the battery holder.

As shown in the exploded perspective view of FIG. 9, the battery storage space of the battery holder 70 is divided in half into a first subholder 71A and a second subholder 71B, and the secondary batteries 1 are interposed between the first subholder 71A and the second subholder 71B. In this example, the battery holder 70 holds ten secondary batteries 1. In the battery holder 70, the secondary batteries 1 housed inside the battery storage space are connected by their end surfaces exposed in the exposed portion to the battery lead plates 80.

(Battery Lead Plate 80)

As shown in the exploded perspective view of FIG. 9, the battery lead plates 80 are flat metal plates with superior conductive properties that are formed into a size that can be housed inside the battery storage space. Welding slits are formed in the battery lead plates 80 for spot welding, and are secured to the end surface of adjacent secondary batteries 1 housed inside the battery storage space.

(Circuit Board Securing Portion 75)

Figure 10:
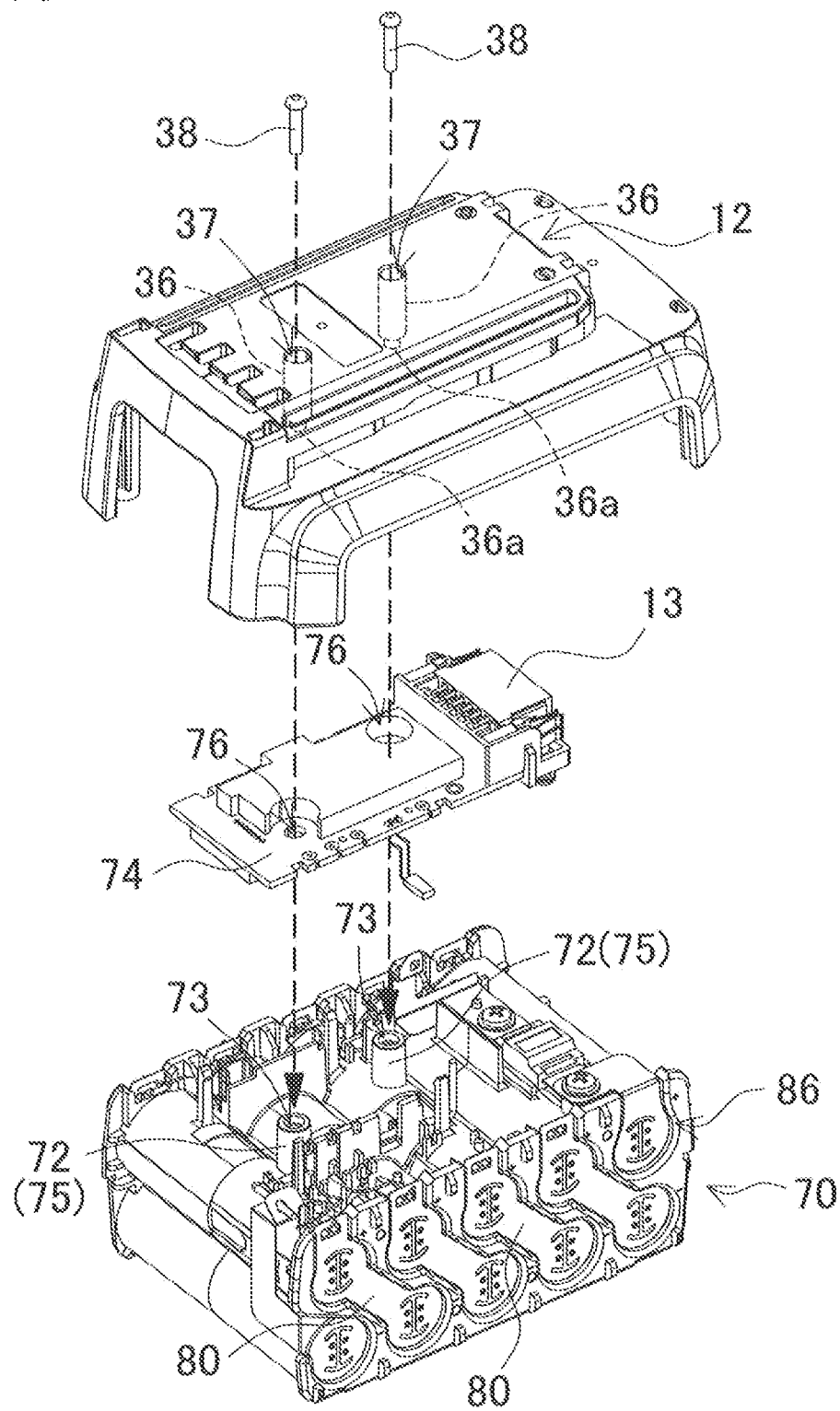
FIG. 10 is an exploded perspective view showing the pack circuit board interposed between the upper casing and the battery holder.
Figure 11:
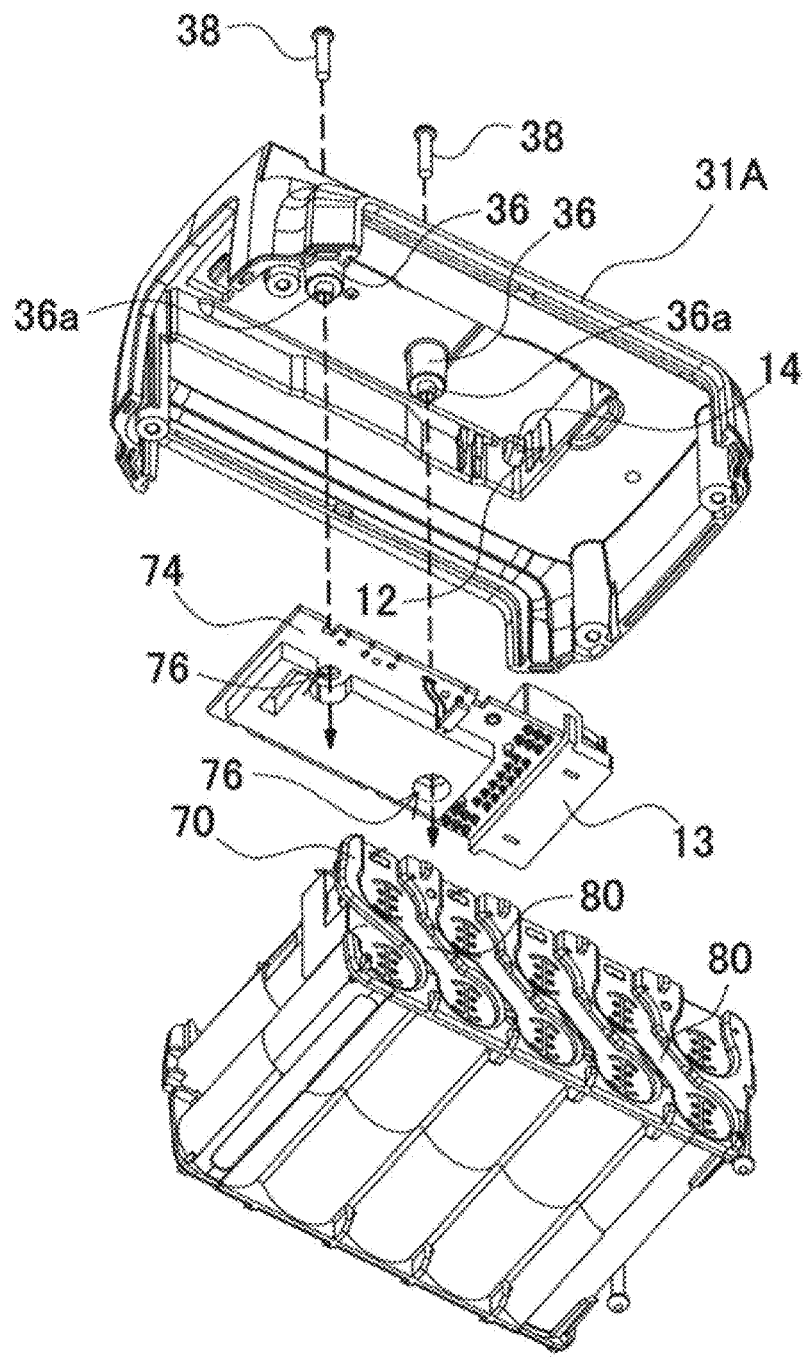
FIG. 11 is an exploded perspective view from below of the upper casing in FIG. 10.
Figure 12:
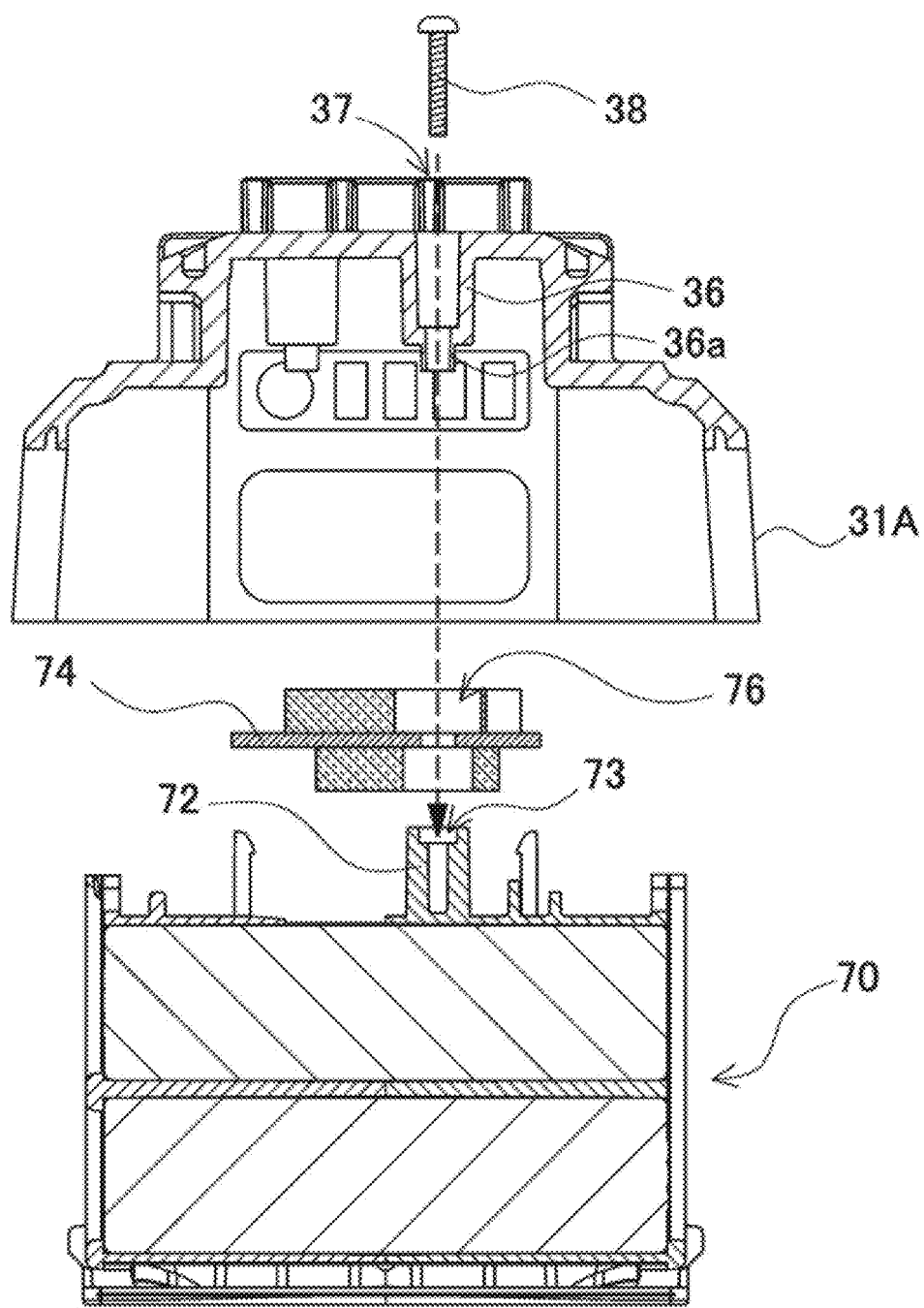
FIG. 12 is a vertical cross-sectional view of FIG. 10.
Figure 13:
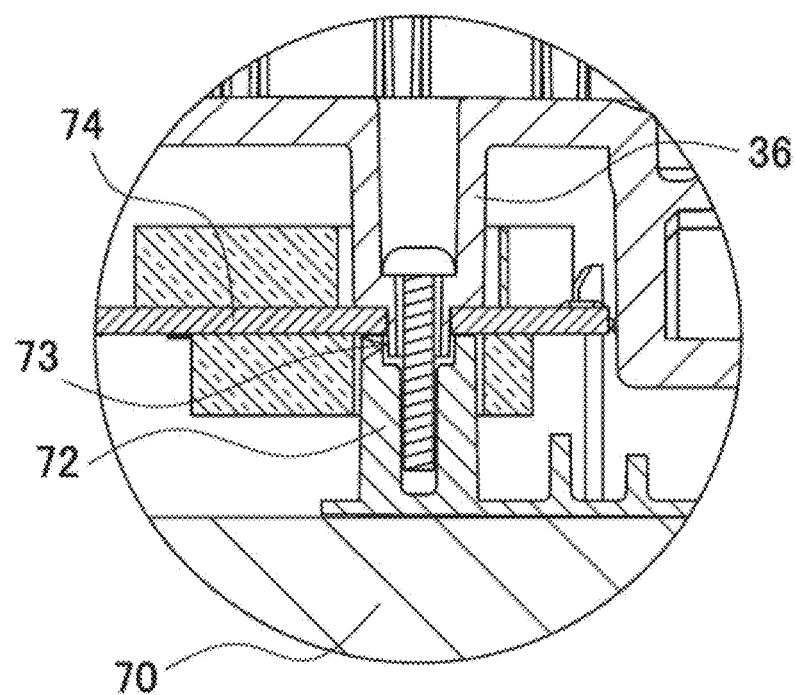
FIG. 13 is an enlarged cross-sectional view of the essential components showing the pack circuit board interposed between the upper casing and the battery holder in FIG. 12.

A circuit board securing portion 75 is provided in the upper surface of the battery holder 70 to secure the pack circuit board 74. FIG. 10 through FIG. 13 show a pack circuit board 74 mounted in the circuit board securing portion 75. FIG. 10 is an exploded perspective view showing the pack circuit board 74 interposed between the upper casing 31A and the battery holder 70. FIG. 11 is an exploded perspective view from below of the upper casing 31A in FIG. 10. FIG. 12 is a vertical cross-sectional view of FIG. 10. FIG. 13 is an enlarged cross-sectional view of the essential components showing the pack circuit board 74 interposed between the upper casing 31A and the battery holder 70 in FIG. 12. The battery holder 70 shown in these drawings has bosses 72 for supporting the pack circuit board 74. A tiered portion 73 is provided on the front edge of the boss 72 as a pin coupling unit. Tiers are cut into the tiered portion 73 whose diameter becomes progressively smaller than the outer diameter of the boss 72 with every turn, and a hollow cylindrical shape is formed which is recessed from the open end. Threading is cut into the inner surface of the cylindrical shape.

Boss holes 76 are provided in the pack circuit board 74 in positions corresponding to the bosses 72. The tip of a boss 72 is inserted into the boss hole 76 from the underside of the pack circuit board 74, and the pack circuit board 74 is supported by the tiered portion 73 of the boss 72.

An insertion pin 36a is provided on the upper casing 31A in a position corresponding to the boss 72. The insertion pin 36a is provided on the end surface of a column 36 protruding downwards from the inside of the upper casing 31A. The column 36 has a columnar outer profile, and the insertion pin 36a forms a cylinder connected to the column 36 on the interior. A threaded hole 37 is formed on the upper surface of the upper casing 31A. As shown in FIG. 12 and FIG. 13, the insertion pin 36a in the upper casing 31A is inserted into the opening in the battery holder 70 inserted into the boss hole 76 in the pack circuit board 74, and a screw 38 is screwed in from the upper casing 31A to secure the pack circuit board 74 with the boss hole 76 in the pack circuit board 74 interposed between the end surface of the column 36 and the tiered portion 73. Using this structure, the pack circuit board 74 can be secured at the same time the upper casing 31A and the battery holder 70 are secured. More specifically, the same screw used to secure the pack circuit board 74 can be used to secure the upper casing 31A, which reduces component costs and the number of spots in which a screw has to be fastened.

Boss holes 76 are formed diagonally in the pack circuit board 74. This enables the pack circuit board 74 to be positioned and secured on the circuit board securing portion 75 on the battery holder 70 in the XY directions. By interposing the pack circuit board 74 between the end surface of the column 36 in the upper casing 31A and the tiered portion 73 of the battery holder 70, and securing the board using a screw, the pack circuit board 74 can also be positioned in the height direction. A securing structure for the pack circuit board 74 using a boss 72 and insertion pin 36a can thus simultaneously position the pack circuit board 74 in the XYZ directions.

Example 2

Figure 14:
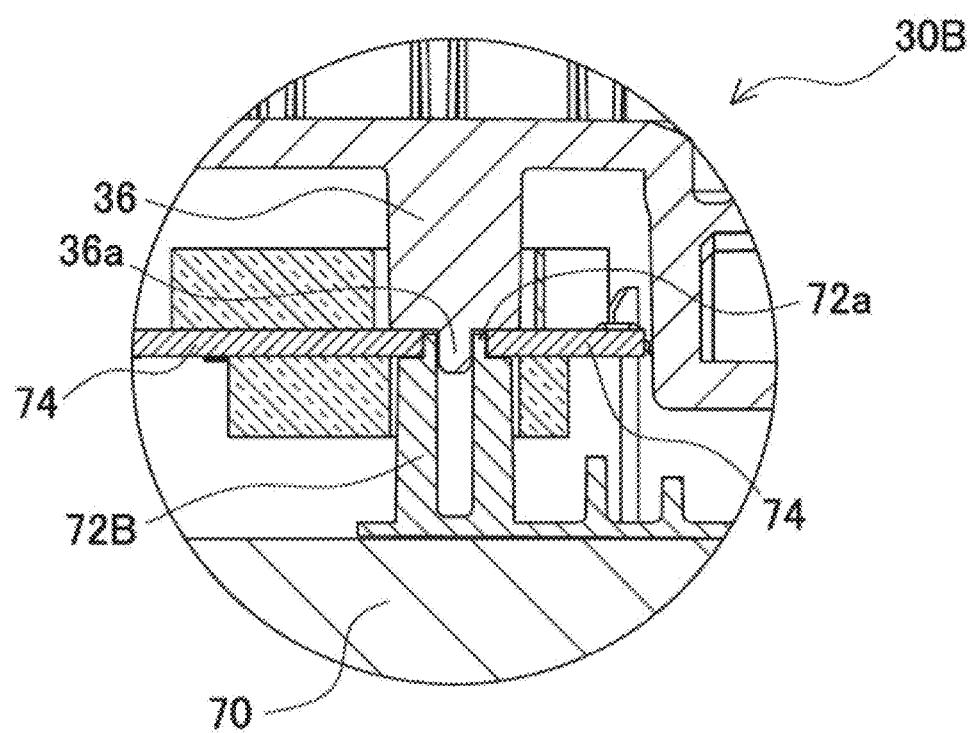
FIG. 14 is a cross-sectional view showing the securing structure for the pack circuit board in a second embodiment.

In the example explained above, the pack circuit board 74 was secured in this structure using a screw. However, the present invention is not limited to this configuration. A configuration can also be used in which the pack circuit board 74 is not secured using a screw. The battery pack 30B is the second example is shown in FIG. 14. In this example, threading is not formed in the boss 72B, a threaded hole is not provided in the insertion pin 36a, the insertion pin 36a is inserted into the boss 72B, and the pack circuit board 74 is interposed between the end surface of the column 36 in the upper housing 31A and the tiered portion 73 of the battery holder 70. In this situation, the upper casing 31A and the lower casing 31B are secured using screws or some other means, which also secures the pack circuit board 74. In this example, a tiered portion 73 is provided in the end of the boss 72B, and a column-shaped protrusion 72a is formed on the inside of the tiered portion 73 whose diameter becomes progressively smaller than the outer diameter of the boss 72B with every turn. The tip of the boss 72B is inserted into the boss hole 76 from the underside of the pack circuit board 74, the pack circuit board 74 is supported by the tiered portion 73 of the boss 72, and the column-shaped protrusion 72a is arranged in the boss hole 76. Here, the column-shaped protrusion 72a is shorter than the thickness of the pack circuit board 74, and its diameter is smaller than the boss hole 76. It can also be configured so that the insertion pin applies pressure to the tip of the boss.

When the pack circuit board is secured by screwing screws into holes formed in the pack circuit board, the pack circuit board securing operation is time-consuming. When there are many threaded holes, the number of operations is increased, and manufacturing costs also increase. Because the battery pack in the second example does not require screws to secure the pack circuit board 74 to the battery holder 70, the assembly operation is easy, and separate securing components such as screws are not required. This reduces the number of required components, and also lowers manufacturing costs.

(Mounting Mechanism)

The battery pack also has a mounting mechanism for mechanically mounting the battery case 31 in a battery-operated device or a battery pack charger. Here, the mounting mechanism has a latching unit 50. The latching unit has an engaging hook 54 and a detachment unit 52, and the engaging hook 54 can be switched between protruding and receding by sliding the detachment unit 52. A holding recess 17 is formed in the battery-operated device to engage the engaging hook 54. The engaging hook 54 protrudes from the upper casing 31A of the battery case 31 and engages the holding recess 17 to mount the case in the battery-powered device. By sliding the detachment unit 52, the engaging hook 54 moves from the locked position in which the engaging hook 54 protrudes and the unlocked position in which the hook recedes and is housed inside the battery case 31. The battery pack can be detached by simply releasing the hook (to be explained in greater detail below). In this example, this mounting mechanism is provided on the upper casing 31A side.

(Electrical Connections)

As explained above, the battery pack 30 has electrical connections for connecting the pack to a battery-powered device or battery pack charger 100. The electrical connections are connected electrically to the battery-powered device or battery pack charger to give and receive electric power. For example, as shown in FIG. 15 through FIG. 18, when the battery pack 30 is mounted in the battery pack charger 100, the plurality of connection terminals 3 arranged on the mounting portion 2 of the battery pack charger 100 are connected to the connectors 13 serving as the electrical connections. The connectors 13 are secured to the pack circuit board 74. In addition to output from the secondary batteries 1, signal terminals can be provided to exchange signals with the battery pack charger 100 or power tool PT to which the battery pack has been connected.

Figure 34:
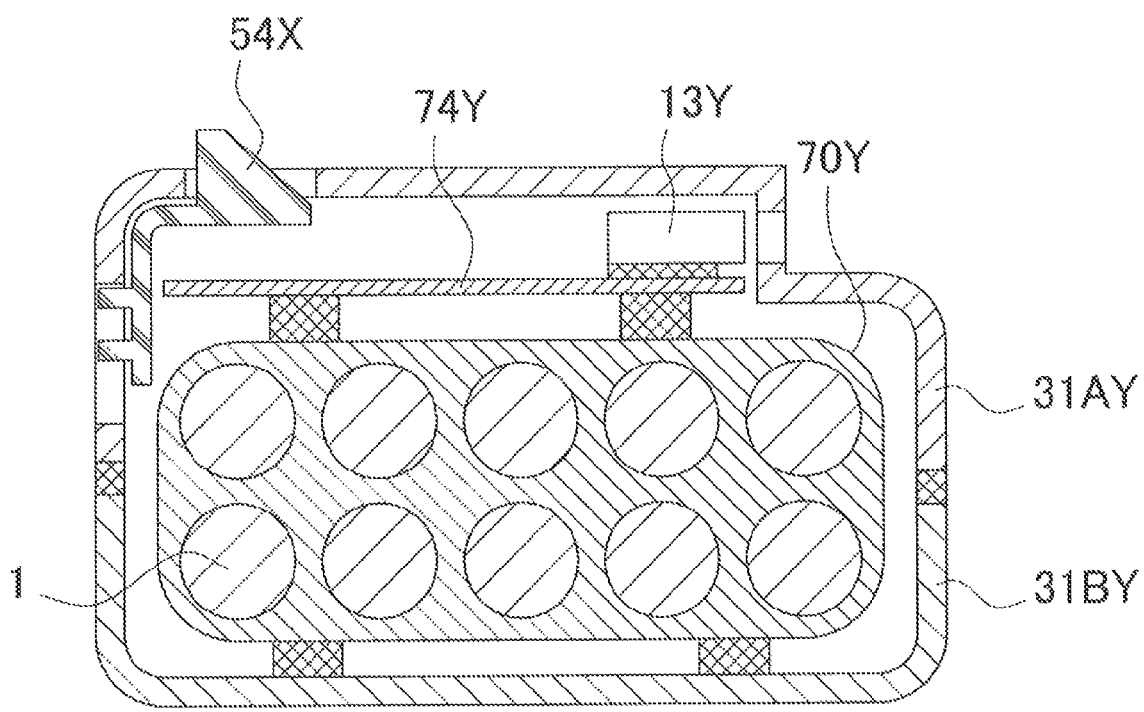
FIG. 34 is a vertical cross-sectional view showing the internal structure of a battery pack of the prior art.

In the structure used to connect and disconnect the battery pack from a battery-operated device, the mounting mechanism used as the mechanical connection structure and the electrical connection used as the electrical connection structure are separate. Separating the mechanical connection structure from the electrical connection structure can improve the mechanical connection strength while also improving the stability and reliability of the electrical connection. However, the mechanical connection structure and the electrical connection structure have to be properly positioned with respect to each other. In other words, even when a mechanical linkage is performed, the electrical connection may be misaligned. As a result, contact is unstable or an electrical connection is not obtained. On the other hand, when the focus is placed on the electrical connection, a proper mechanical structure is not obtained. Therefore, it is important to position the electrical connection structure and the mechanical connection structure in the design of the battery pack in order to be able to achieve proper connection of both. The battery pack may also become detached from the battery-powered device while still in use. In the prior art configuration, as shown in the cross-sectional view of FIG. 34, the mechanical connection is provided on the upper casing 31AY and the electrical connector for establishing an electrical connection is fixed to the pack circuit board 74Y secured to the lower casing 31BY via the battery holder 70Y. There are many connections and errors in the positioning of these components, in addition to the manufacturing tolerances of these components. Therefore, it is difficult to improve positioning accuracy of the electrical connections and mechanical connections in the assembly process in a cost-effective way.

In this embodiment of the present invention, the mounting mechanism is partially exposed on the surface of the upper casing 31A. Also, as shown in FIG. 11, the pack circuit board 74 is secured on the upper housing 31A side. Here, a column 36 protruding vertically from the inside surface of the upper housing 31A and an insertion pin 36a protruding from the edge of the column 36 are inserted into a boss hole 76 formed in the pack circuit board 74 to restrict the relative positioning of the upper casing 31A and the pack circuit board 74. Meanwhile, the latching unit serving as the mounting mechanism has a hook protrusion window 15 formed in the upper casing 31A from which an engaging hook 54 protrudes. In this configuration, the mounting mechanism and the electrical connector are positioned with reference to the upper casing 31A. Therefore, the alignment precision is much better than the prior art cases divided into an upper casing and lower casing. When the battery pack is connected electrically to a battery-operated device via a connector 13, the connector 13 secured to the pack circuit board 74 can be positioned in the desired position with the upper casing 31A. Meanwhile, the mechanical connection between the battery pack and the battery-operated device is established using a mounting mechanism provided on the upper casing 31A. The relative position of the electrically connected parts and the mechanically connected parts is governed by the upper casing 31A. Therefore, the cumulative errors in the positions of the connections can be reduced, and the electrical connections and mechanical connections can be positioned properly using an inexpensive configuration.

(Electrical Connection Holder 14)

An electrical connection holder 14 can be provided in the upper casing 31A to hold the electrical connections. In the example shown in FIG. 11, holding ribs clamping the connector 13 from both sides is provided on the inside surface of the upper casing 31A as the electrical connection holder 14. In this configuration, the electrical connection is positioned directly on the upper casing 31A, and not via the pack circuit board. As a result, the positioning of the electrical connection with respect to the upper casing 31A is more accurate.

(External Connection Terminals 33)

Figure 20:
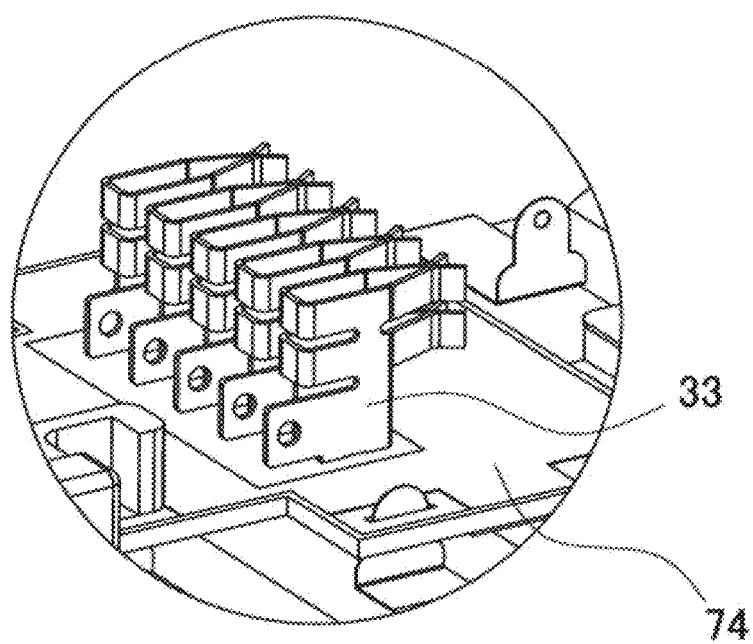
FIG. 20 is a perspective view showing external connection terminals attached to the pack circuit board.
Figure 21:
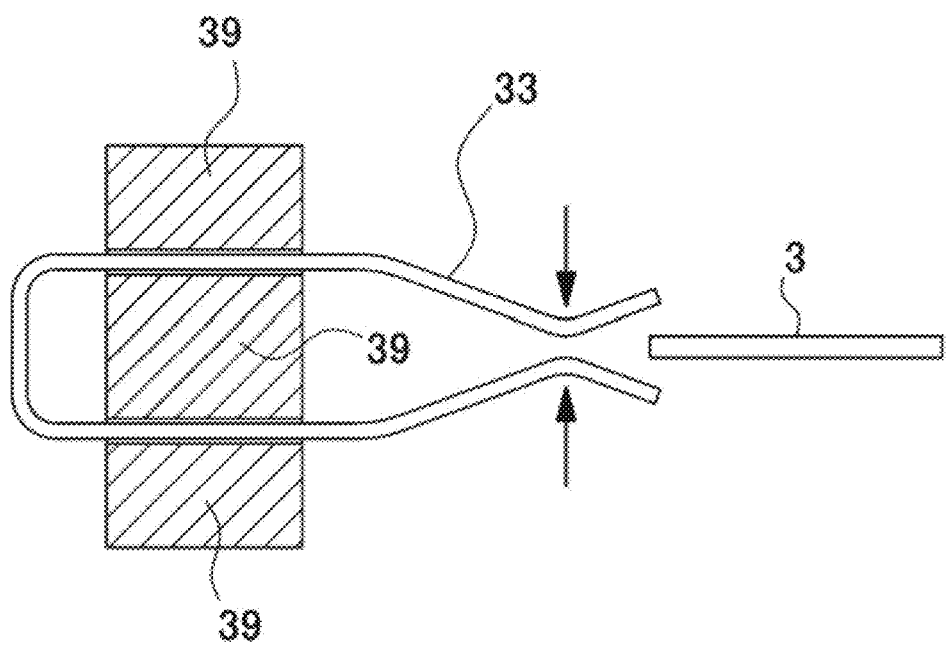
FIG. 21 is a horizontal cross-sectional view showing the upper end of an external connection terminal held by a positioning rib.

The electrical connections are not restricted to connectors. Other components can be used. For example, they can be metal plates as shown in FIG. 19 through FIG. 21. Here, external connection terminals 33 consisting of bent metal plates constitute the electrical connections. As shown in FIG. 20 and FIG. 21, each external connection terminal 33 has a rear end bent into a C-shape when viewed from above. The open end of the C-shape is bent in a tapered fashion so as to become gradually narrower at the tip connected electrically to a connection terminal on an externally connected device such as a battery pack charger 100 or power tool PT. The connection terminal on the externally connected device is inserted between the two bent metal plates, and is interposed between the two metal plates to establish an electrical connection.

(Terminal-Positioning Rib 39)

In an example using external connection terminals 33, the electrical connection holder 14 provided on the inside surface of the upper casing 31A consists of terminal-positioning ribs 39 for holding the upper edge of the external connection terminals 33. This can improve the reliability of the electrical connection of the external connection terminals 33. A variation is shown in FIG. 19 (a) through FIG. 19 (b). FIG. 19 (a) is a horizontal cross-sectional view of the battery pack in a variation, and FIG. 19 (b) is an enlarged cross-sectional view of FIG. 19 (a).

The external connection terminals 33 are usually bent metal plates. Here, the variation in positioning is increased not only by the manufacturing tolerance of the external connection terminals 33 themselves, but the cumulative effect of the manufacturing tolerance and other tolerances, such as the mounting tolerance when the external connection terminals 33 are mounted on the pack circuit board 74, and the mounting tolerance of the pack circuit board 74 and the lower casing 31B. Therefore, when the external connection terminals 33 engage the terminals of the battery pack charger 100 or power tool PT, problems occur such as skewed contact positions.

Even when the external connection terminals 33 can be mounted in the proper position, the external connection terminals 33 are secured on top of the pack circuit board 74 in an upright position as shown in FIG. 20. When the battery pack has been attached to and detached from the battery pack charger 100 or power tool PT many times and the terminals are repeatedly inserted and removed, the external connection terminals 33 may become warped and gradually lose their resilience.

(Variation)

In this example, the lower end of the external connection terminals 33 are not only secured to the pack circuit board 74, a securing mechanism is also provided on the upper end. As shown in the cross-sectional view of FIG. 19, terminal positioning ribs 39 are provided on the inside surface of the upper casing 31A. A plurality of slits are provided in the terminal positioning ribs 39 in positions corresponding to the external connection terminals 33, the upper ends of the external connection terminals 33 are inserted into the slits, the upper end of the external connection terminals 33 are clamped on both sides as shown in the horizontal cross-sectional view of FIG. 21, and the upper end of the external connection terminals 33 is secured along with the lower end, thereby properly positioning and securing the external connection terminals 33 so that there is no displacement. This can also prevent deformation of the terminals due to repeated attachment and detachment. This simple configuration can also provide proper positioning of the external connection terminals 33, and improve the reliability of the electrical connections when the battery pack is mounted in an external battery pack charger 100 or power tool PT.

The slits in the terminal positioning ribs 39 are preferably nearly the same or somewhat narrower than the thickness of the external connection terminals 33 in order to be able to clamp the upper end of the external connection terminals 33. In this way, the external connection terminals 33 can apply pressure to the slits in the terminal positioning ribs 39, and reliably secure the upper ends of the external connection terminals 33.

A slit-shaped cut can also be provided in the rear end of the external connection terminals 33 as shown in the perspective view of FIG. 20. This cut allows the external connection terminals 33 to be readily deformed when the upper ends of the external connection terminals 33 apply pressure to the terminal positioning ribs 39. Slight mounting errors and tolerances are absorbed by this deformation, and the external connection terminals 33 can be secured by the terminal positioning ribs 39.

The positioning accuracy of the external connection terminals 33 can be improved by this structure, which positions the external connection terminals 33 directly on the inside of the battery case 31.

(Latching Unit 50)

As shown in FIG. 1 through FIG. 4, the latching unit 50 provided on the battery pack 30 is movably housed inside the battery case 31 and partially exposed inside the battery case 31. The latching unit 50 has a detachment unit 52 on the front surface which is operated manually by the user, and an engaging hook 54 in the upper portion in the drawing which has both an inclined surface inclined in the forward direction when attached to the battery pack 30, and a perpendicular surface formed continuously with the perpendicular surface. The engaging hook 54 is integrally molded with the detachment unit 52. A holding recess 17 is formed in the detachment unit 2 in a position corresponding to the engaging hook 54. This holding recess 17 also has a recessed inclined surface aligned with the inclined surface of the hook, and a recessed perpendicular surface aligned with the horizontal surface of the hook.

Figure 15:
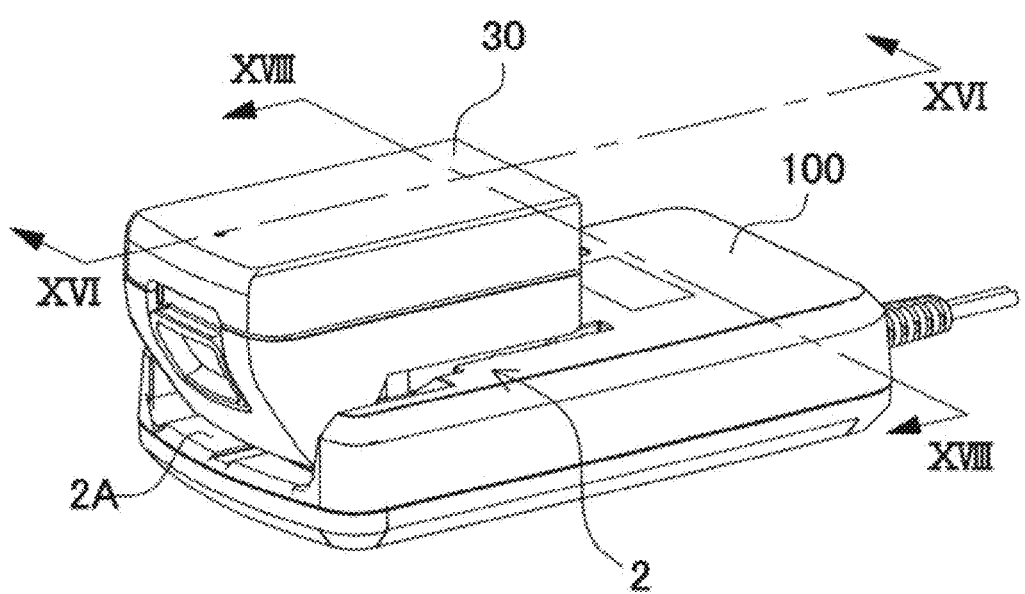
FIG. 15 is a perspective view showing the battery pack installed in a battery pack charger.
Figure 16:
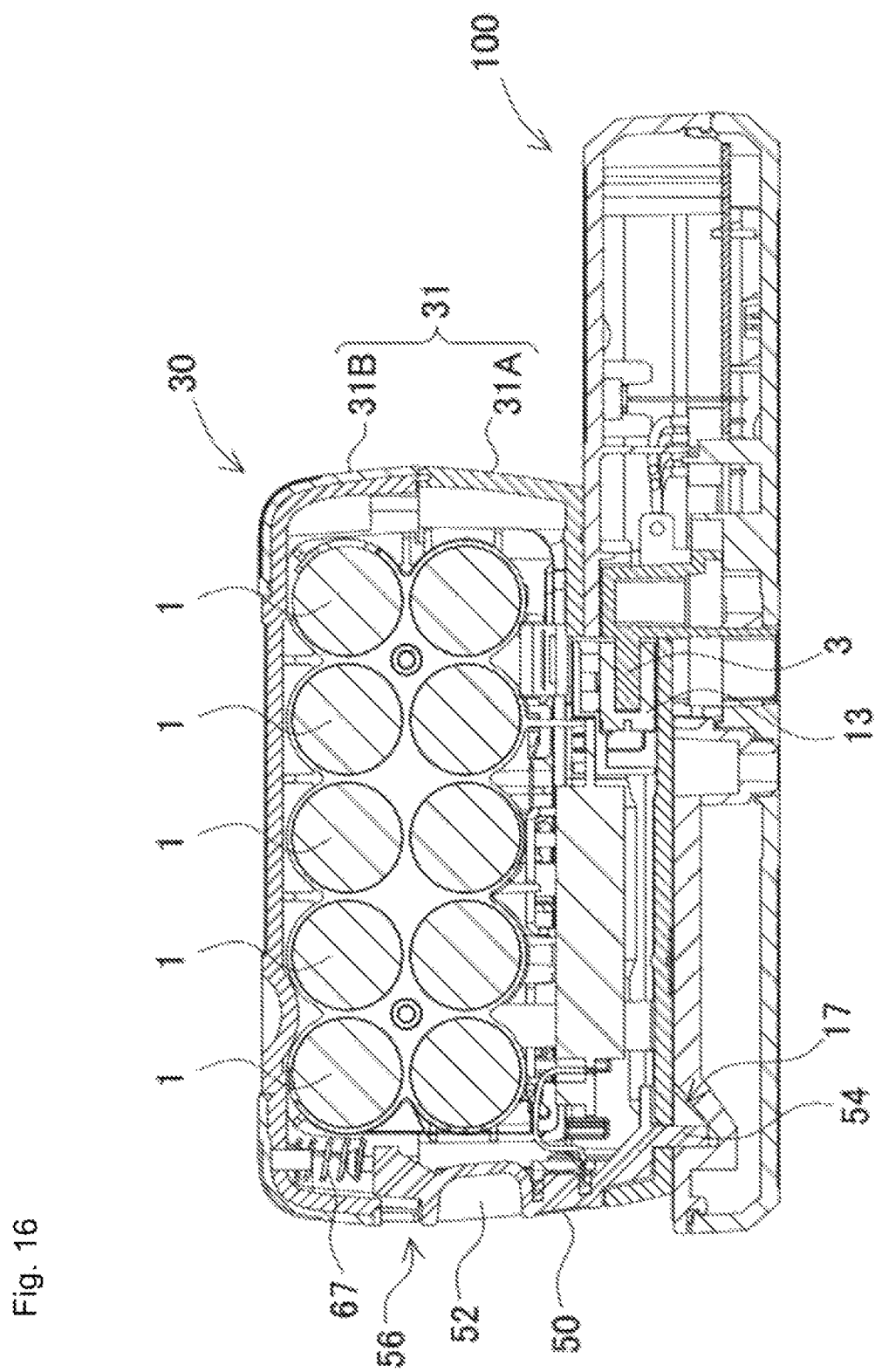
FIG. 16 is a vertical cross-sectional view from line XVI-XVI in FIG. 15.
Figure 17:
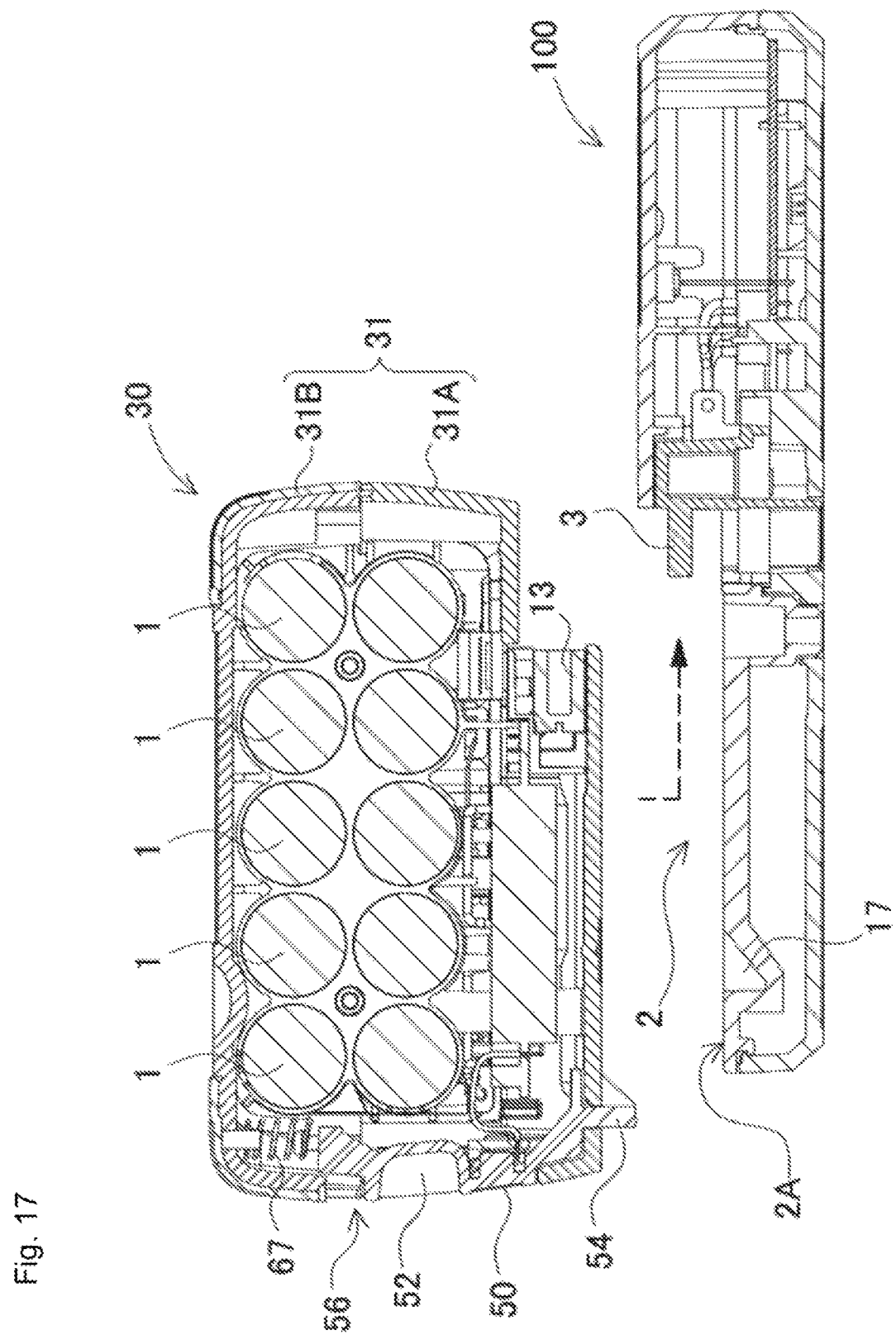
FIG. 17 is a vertical cross-sectional view showing the battery pack removed from the battery pack charger in FIG. 16.
Figure 18:
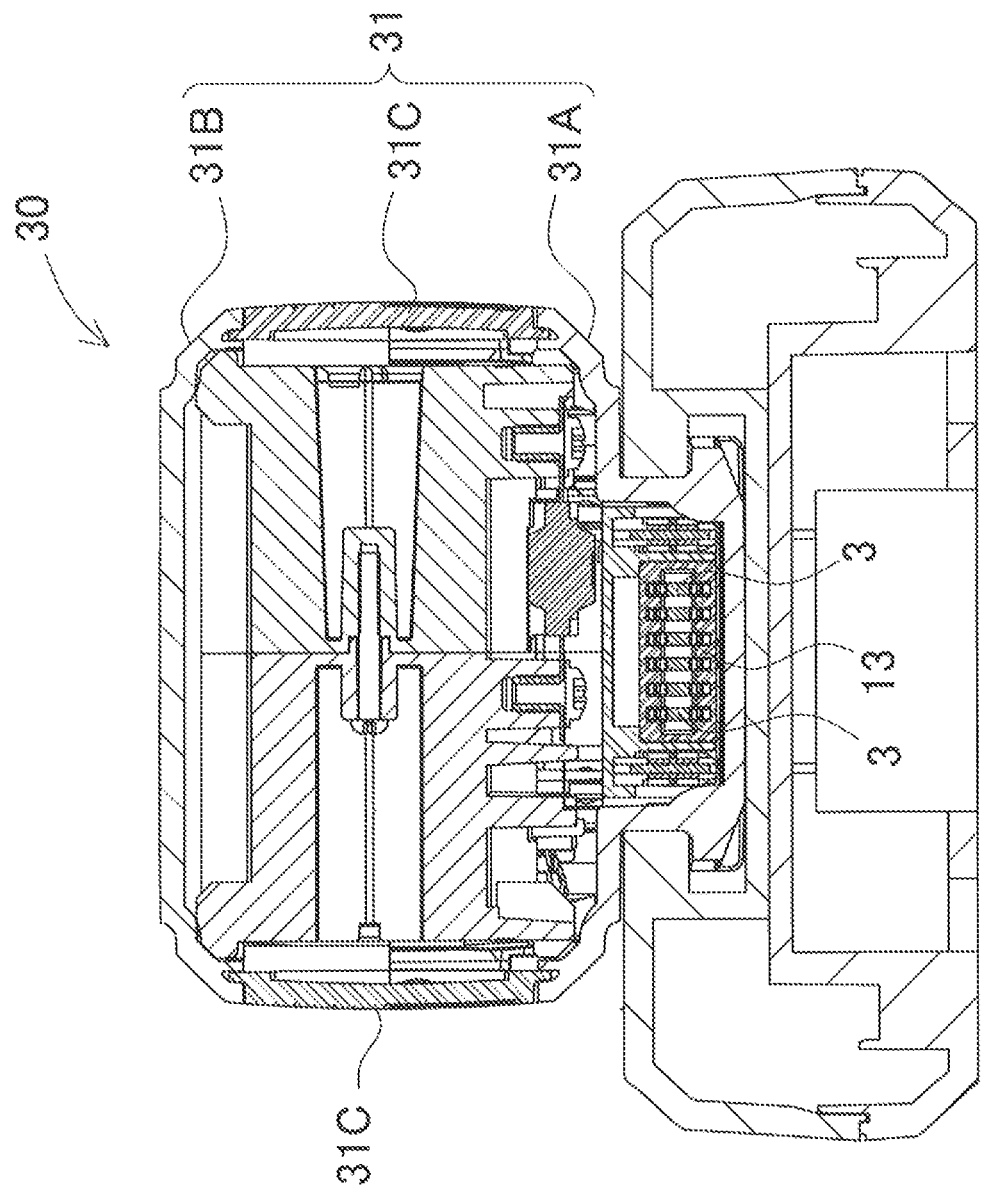
FIG. 18 is a vertical cross-sectional view from line XVIII-XVIII in FIG. 15.

A battery pack 30 mounted in a dedicated battery pack charger 100 is shown in FIG. 15 through FIG. 18. FIG. 15 is a perspective view showing the battery pack installed in a battery pack charger 100. FIG. 16 is a vertical cross-sectional view from line XVI-XVI in FIG. 15. FIG. 17 is a vertical cross-sectional view showing the battery pack 30 removed from the battery pack charger 100 in FIG. 16. FIG. 18 is a vertical cross-sectional view from line XVIII-XVIII in FIG. 15. As shown in the drawings, the engaging hook 54 is biased by a resilient component 57 such as a coil spring so as to protrude downwards. When mounted in the mounting unit 2, the inclined portion of the battery pack 30 is pressed down in the sliding direction of the battery pack 30 to allow the battery pack 30 to advance. When the battery pack 30 has advanced to a predetermined position, the engaging hook 54 is accommodated in the holding recess 17 formed in this position, the engaging hook 54 is pressed by the resilient component 57, the perpendicular surface makes contact with the recessed perpendicular surface and becomes engaged. When force is applied in this state to pull the battery pack 30 out of the mounting unit 2, the battery pack 30 remains engaged because the perpendicular surface remains in contact with the recessed perpendicular surface and does not slide out. When the user removes the battery pack 30 from the battery pack charger 100, the detachment unit 52 of the latching unit 50 is manually pushed down to release the engaging hook 54 from the holding recess 17. This allows the battery pack 30 to slide and be removed. The battery pack 30 is inserted into mounting guides in the pack guide provided on the side surface, and slidably pushed into the mounting unit. The connectors 13 in the battery pack 30 make contact with the connection terminals 3 of the battery pack charger 100, the latching unit 50 engages the holding recess 17, and the battery pack is mounted in the battery pack charger 100.

When the battery pack 30 is set in the battery pack charger 100 as shown in FIG. 15, the external terminals 33 of the battery pack 30 is connected to the connection terminals 3 provided in the battery pack charger 100. Power is received by the battery pack 30 from the battery pack charger 100, and the secondary batteries 1 inside the pack can be charged. In addition to the supply of power, various signals can be exchanged via signal terminals. FIG. 22 is a circuit diagram showing the battery pack 30 connected to a battery pack charger 100.

The mounting unit 2 of the battery pack charger 100 has a plurality of connection terminals 3 arranged in the middle of the bottom surface 2A so as to protrude from the bottom surface 2A. These connection terminals 3 are arranged side-by-side in rows. The connection terminals 3 in the battery pack charger 100 are metal plates 10 with the same profile arranged parallel to each other. These plate-shaped connection terminals 3 are arranged in the insertion direction of the battery pack 30 so as to be perpendicular to the bottom surface 2A of the mounting unit 2. The vertical connection terminals 3 secured to the terminal holder 8 in a plurality of rows are preferably maintained in a position extending in the mounting direction of the battery pack 30 so that the connection terminals 3 can smoothly come into contact with the external terminals 33 of the battery pack 30 when the battery pack 30 is mounted.

The connection terminals 3 consist of metal plates 10 made from a metal with superior conductivity such as nickel, copper or a copper alloy. The connection terminals do not have to be plate-shaped. The terminals can be of any shape that is exposed inside the mounting unit and able to connect with the external terminals of the mounted battery pack.

The plurality of connection terminals 3 are arranged on both sides of the positive and negative charging terminals 4, and a non-charging terminal 5 is arranged between these charging terminals 4. The charging terminals 4 are positive and negative high-voltage terminals for charging the secondary batteries 1 inside the battery pack 30. The non-charging terminal 5 is a signal terminal for exchanging battery information with the battery pack 30. The connection terminals 3 can also be arranged so that the non-charging terminal 5 arranged between the charging terminals 4 protrudes further than the charging terminals 4 on both sides. This structure allows for contact of the non-charging terminal 5 on a priority basis when a foreign metal body has come into contact with the connection terminals 3 on the upper surface. It also keeps both ends from coming into contact with the charging terminals 4 on both sides.

(Charging Circuit 20)

The battery pack charger 100 includes a charging circuit 20 for charging the battery pack 30 mounted in the mounting unit 2. The positive and negative charging terminals 4 arranged on both sides of the battery pack charger 100 are connected to the positive and negative charge/discharge terminals 34 of the battery pack 30 mounted in the mounting unit 2, and charging power is supplied to the battery pack 30. As shown in the circuit diagram of FIG. 22, the positive charging terminal 4 is connected to the charging circuit 20, power is supplied to the battery pack 30, and the secondary batteries 1 inside the pack are charged. In this battery pack charger 100, alternating current power supplied from a commercial source (not shown) is converted to direct current power by a rectifier circuit 22, the direct current voltage is converted to the charging voltage by the charging circuit 20, and the converted voltage is outputted from the charging terminal 4. The charging circuit 20 changes the duty by turning ON and OFF a switching element (not shown) connected between the output end of the rectifier circuit 22 and the positive charging terminal 4, and the voltage and current for charging the battery pack 30 are optimized.

The non-charging terminal 5 arranged between the pair of charging terminals 4 is a signal terminal. There are two signal terminals among the connection terminals 3 shown in the drawing. These signal terminals serve as abnormal signal terminals to which abnormal signals from the secondary batteries 1 in the battery pack 30 are inputted, temperature signal terminals to which temperature signals from the secondary batteries 1 in the battery pack 30 are inputted, and identification signal terminals to which identification signals from the secondary batteries 1 in the battery pack 30 are inputted. The signal terminals can also serve as signal terminals for transmitting other types of battery information, such as the charge level of the batteries.

When abnormal signals are inputted to the abnormal signal terminal, the control circuit 21 determines that the battery pack 30 has experienced an abnormality, and turns OFF the charging circuit 20 to stop the charging process. The control circuit 21 detects the temperature of the secondary batteries 1 inside the battery pack 30 from the temperature signals inputted to the temperature signal terminal. When the battery temperature exceeds the maximum temperature, the control circuit 21 stops the charging current to suspend the charging process, or reduces the charging current to lower the battery temperature. When the battery temperature is below an established temperature, charging is being performed at the proper charging current.

The control circuit 21 determines the optimum voltage and current for charging the battery pack 30 from the battery identification signals inputted from the identification signal terminal, and changes the charging voltage and current outputted from the charging terminal 4. When a battery pack 30 has been mounted in the battery pack charger 100, the battery identification signals outputted from the control unit 40 of the battery pack 30 are received by the control circuit 21, and the control circuit 21 identifies the type of battery pack 30 from the inputted battery identification signals. It then controls the charging circuit 20 to charge the battery pack 30 at the optimum voltage and current. Because the battery pack charger 100 identifies the voltage and current for charging the battery pack 30 from the battery identification signals inputted from the battery pack 30 and then optimizes the voltage and current, different types of battery packs with different output voltages can be charged using a single battery pack charger. However, the output voltage of the battery pack charger does not have to be switched. The battery packs can be charged at a constant output voltage.

(Mounting Mechanism)

The battery pack 30 has a latching unit 50 serving as a mounting mechanism for mounting a battery pack 30 in a battery-powered device or battery pack charger 100. The latching unit 50 is provided with a detachment unit 52 for locking and unlocking the battery pack.

(Detachment Unit 52)

Figure 23:
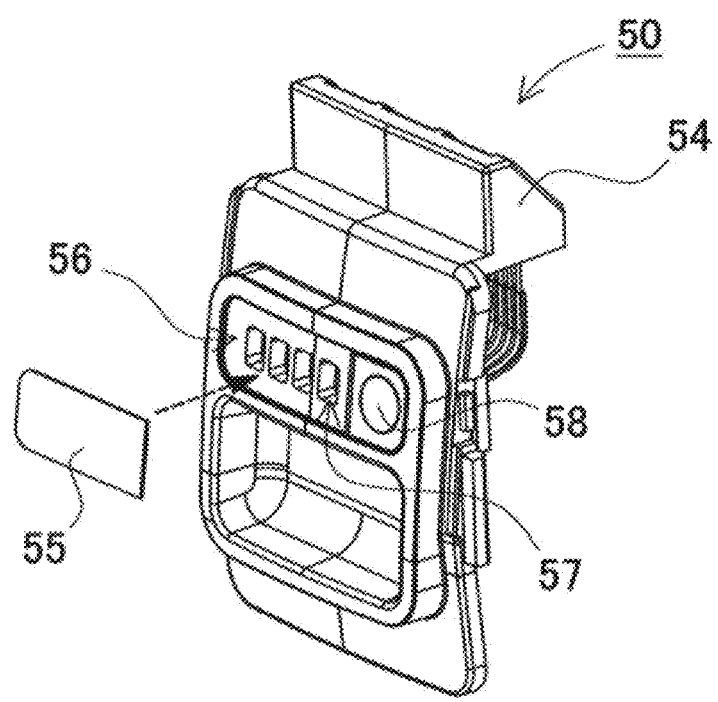
FIG. 23 is a perspective view of the latching unit in FIG. 4.

As shown in the perspective view of FIG. 23, the latching unit 50 includes a detachment unit 52 on the upper surface, and an engaging hook 54 on the bottom surface which has an inclined surface inclined in the mounting direction of the battery pack 30 and a perpendicular surface formed continuously with the inclined surface. The engaging hook 54 is integrally molded with the detachment unit 52. A holding recess 17 is formed in the mounting unit 2 at a position corresponding to the engaging hook 54. The holding recess 17 also has a recessed engaging surface aligned with the inclined surface, and a recessed perpendicular surface aligned with the horizontal surface.

As shown in the cross-sectional views of FIG. 16 through FIG. 17, the engaging hook 54 is biased by a resilient component such as a coil spring so as to protrude downwards. When mounted in the mounting unit 2, the inclined portion of the battery pack 30 is pressed down in the sliding direction of the battery pack 30 to allow the battery pack 30 to advance. When the battery pack 30 has advanced to a predetermined position, the engaging hook 54 is accommodated in the holding recess 17 formed in this position, the engaging hook 54 is pressed by the resilient component, and the perpendicular surface makes contact with the recessed perpendicular surface and becomes engaged. When force is applied in this state to pull the battery pack 30 out of the mounting unit 2, the battery pack 30 remains engaged because the perpendicular surface remains in contact with the recessed perpendicular surface and does not slide out. When the user removes the battery pack 30 from the battery pack charger 100, the detachment unit 52 of the latching unit 50 is manually pushed down to release the engaging hook 54 from the holding recess 17. This allows the battery pack 30 to slide and be removed. The battery pack 30 is inserted into mounting guides in the pack guide provided on the side surface, and slidably pushed into the mounting unit. The connectors 33 in the battery pack 30 make contact with the connection terminals 3 of the battery pack charger 100, the latching unit 50 engages the holding recess 17, and the battery pack is mounted in the battery pack charger 100.

(Mounting Guide)

In order to properly slide the battery pack 30 along the bottom surface 2A of the mounting unit 2, guide protrusions protrude from opposing side walls in the case 1a mounting guides. Also, guide grooves are provided on both side surfaces of the battery case 31 of the battery pack 30 as pack guides to guide the guide protrusions. The guide grooves, as shown in the horizontal cross-sectional view of FIG. 18, are recesses formed to allow the guide protrusions to be inserted. When the battery pack 30 is mounted in the mounting unit 2, the guide protrusions are guided into the guide grooves provided on both side surfaces of the battery pack 30, and the battery pack 30 is guided properly into the mounting unit 2. The guide protrusions can be integrally molded into the side walls on the side receiving the inserted battery pack 30. The guide groves extend in the mounting direction of the battery pack 30, so the battery pack 30 mounted in the mounting unit 2 can slide along the guide protrusions, and the external terminals 33 of the battery pack 30 can come into proper contact with the connection terminals 3 of the mounting unit 2.

In the example explained above, the guide protrusions are provided on the mounting unit 2 side, and the guide grooves are provided on the battery pack 30 side. However, the present invention is not restricted to this configuration. For example, the guide protrusions can be provided on the battery pack side, and the guide grooves can be provided on the mounting unit side.

(Display Unit 56)

Figure 24:
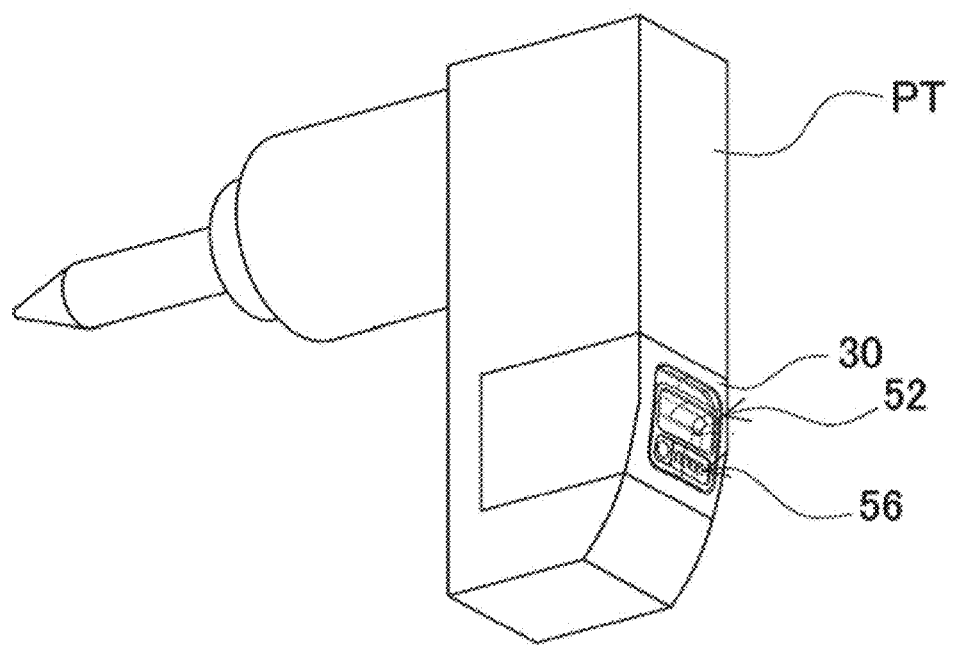
FIG. 24 is a perspective view showing the battery pack installed in a power tool.

The battery pack 30 has a display unit 56 for displaying the status of the secondary batteries 1. As shown in FIG. 1 and FIG. 23, a display unit 56 is provided in the detachment unit 52 of the latching unit 50. This can increase the visibility of the display unit 56. In other words, the entire surface of the battery case 31 does not have to be exposed when the battery case 31 is mounted in the power tool PT or the battery pack charger 100. Instead, as shown in FIG. 24, half of the pack can be embedded in the power tool PT. For this reason, the display unit for displaying the status of the secondary batteries 1 has to be provided on an exposed surface that is visible to the user. When the battery pack 30 is detached, the surface with the detachment unit 52 required to perform this operation is exposed. Therefore, the display unit can be arranged here. However, when the detachment unit 52 is to be made larger to improve ease of use and the display unit is to be made larger to increase its visibility, it may not be desirable or convenient to have both on the same surface as one or the other may have to be reduced in size.

However, in this example, the display unit 56 is provided in the detachment unit 52. As a result, the detachment unit 52 can be increased to the same size as the display unit 56 without sacrificing visibility. As a result, the detachment unit 52 is easier to use and the display unit 56 is easier to view.

Figure 25:
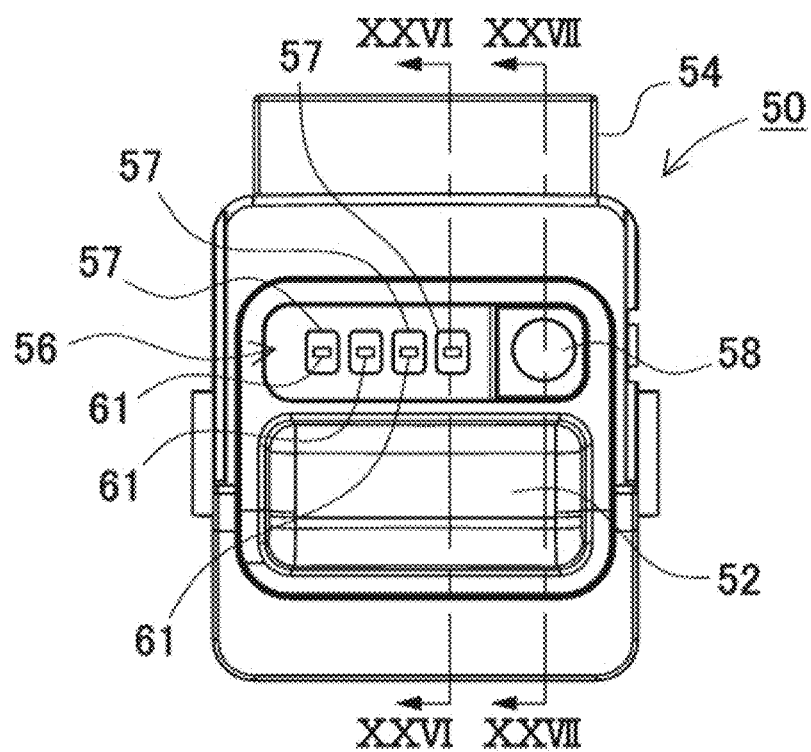
FIG. 25 is a front view of the latching unit in FIG. 23.

The light source of the display unit 56 can be a semiconductor light-emitting element such as an LED or LD, liquid crystals, or organic EL. In this example, the illuminated patterns of an LED 61 display the remaining capacity of the secondary batteries 1. As shown in the perspective view of FIG. 24, a label 55 is applied to the display unit to disperse the light from the light source and make it more visible. In the front view of FIG. 25, there are four square LED windows 57 in the display unit. Here, the remaining capacity is displayed based on the number of illuminated squares. An LED 61 is installed in each LED window 57, and the remaining capacity of the batteries can be displayed based on the illuminated pattern in each square.

Figure 26:
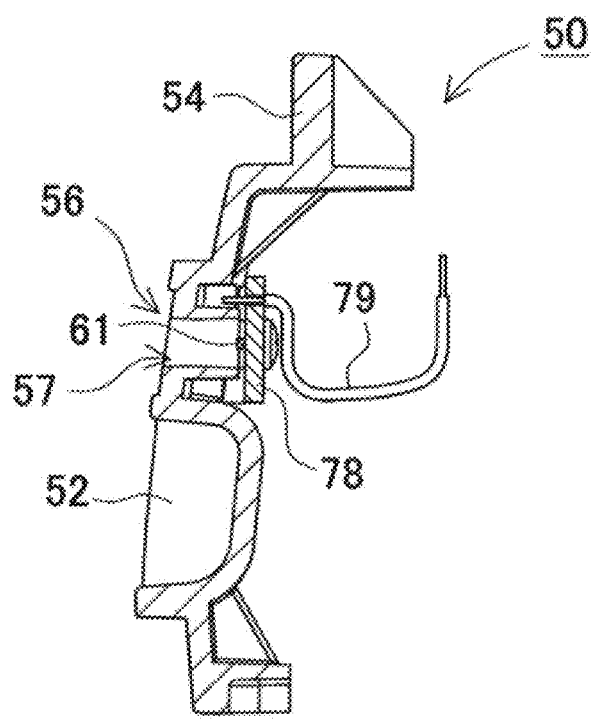
FIG. 26 is a vertical cross-sectional view from line XXVI-XXVI in FIG. 25.
Figure 27:
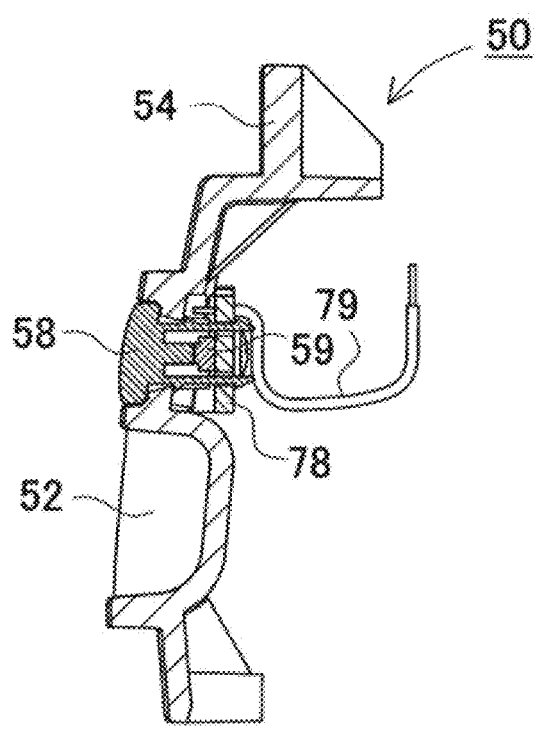
FIG. 27 is a vertical cross-sectional view from line XXVII-XXVII in FIG. 25.

A subcircuit board 78 is provided on the backside of the latching unit 50 as shown in the cross-sectional views of FIG. 26 and FIG. 27. The LEDs 61 and an operating switch 59 are mounted on the subcircuit board 78. Because the latching unit 50 is switched between a locked position and an unlocked position, the board slides vertically. Therefore, in order for the subcircuit board 78 to move with the latching unit 50, a bendable lead wire 79 is provided to supply power to the moving subcircuit board 78. The lead wire 79 is connected to the pack circuit board 74 to supply power to the LEDs 61. In this configuration, the LEDs 61 are provided directly on the sliding latching unit 50, so the light from the LEDs 61 can be transmitted directly to the display unit 56 with sufficient brightness and visibility.

(Manual Operation Button 58)

A manual operation button 58 is provided near the LED windows 57 in the detachment unit 52. As shown in the cross-sectional view of FIG. 27, the manual operation button 58 is linked to the operating switch 59 mounted on the subcircuit board 78 to push down the switch. In other words, the manual operation button 58 functions as a switch cover linked to the operating switch 59. By providing a manual operation button 58 along with the display unit 56 on the detachment unit 52, a large, easy-to-operate switch can be provided while also maintaining the size of the battery case 31. When the operating switch 59 is pushed down via the manual operation button 58 in this example, the remaining capacity of the batteries is displayed for a few seconds.

Example 3

Figure 28:
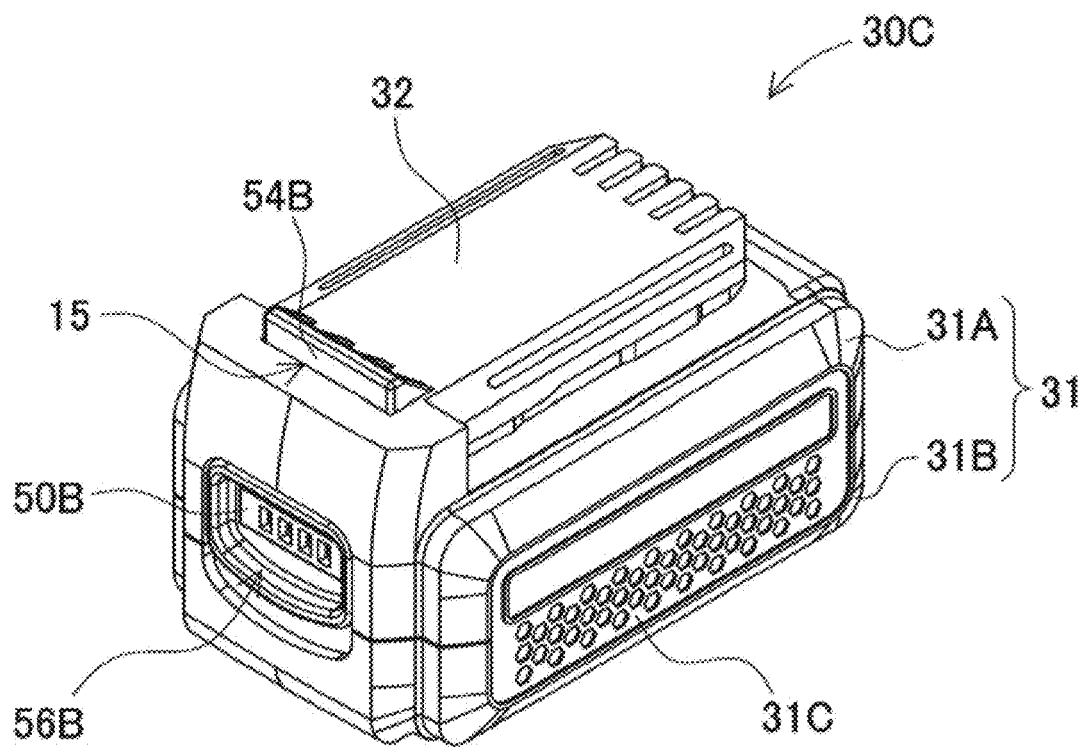
FIG. 28 is an external perspective view showing the battery pack in a third embodiment.
Figure 29:
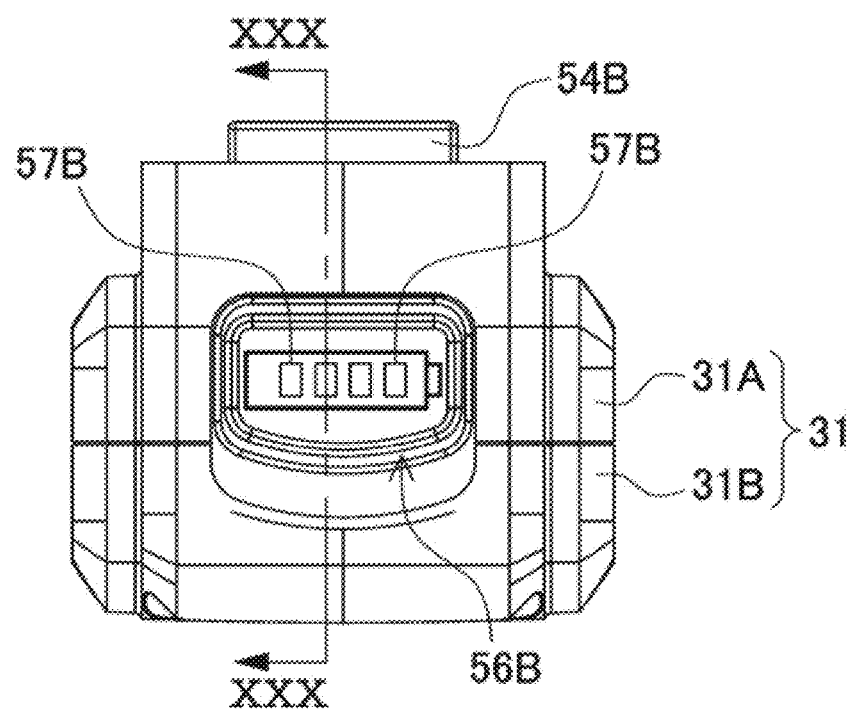
FIG. 29 is a front view of the battery pack in FIG. 28.
Figure 30:
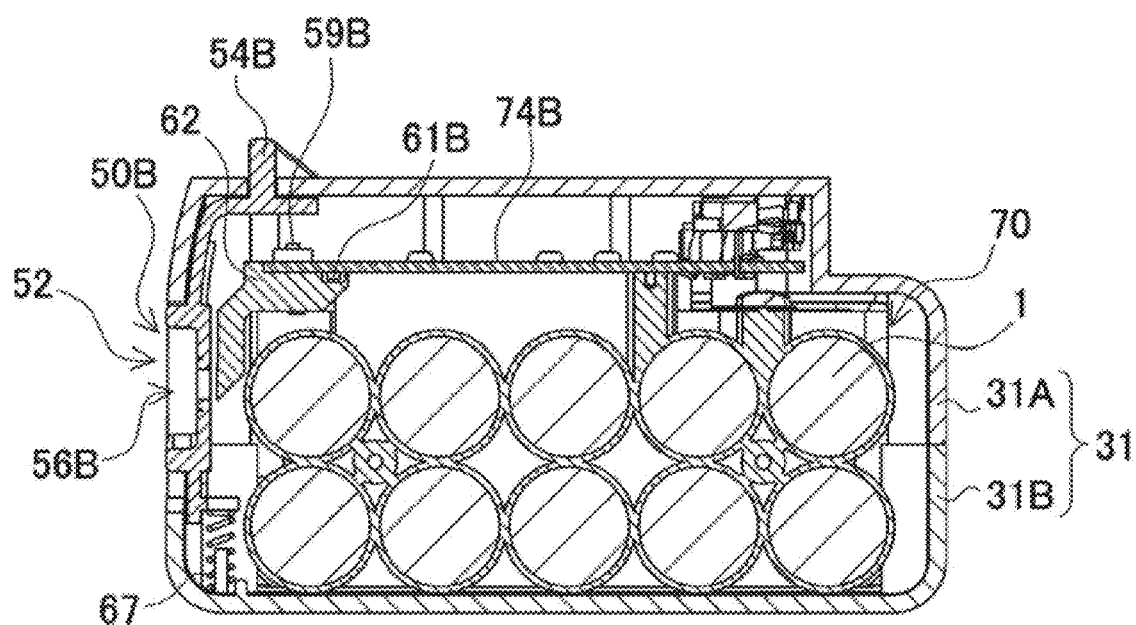
FIG. 30 is a vertical cross-sectional view from line XXIX-XXIX in FIG. 29.
Figure 31:
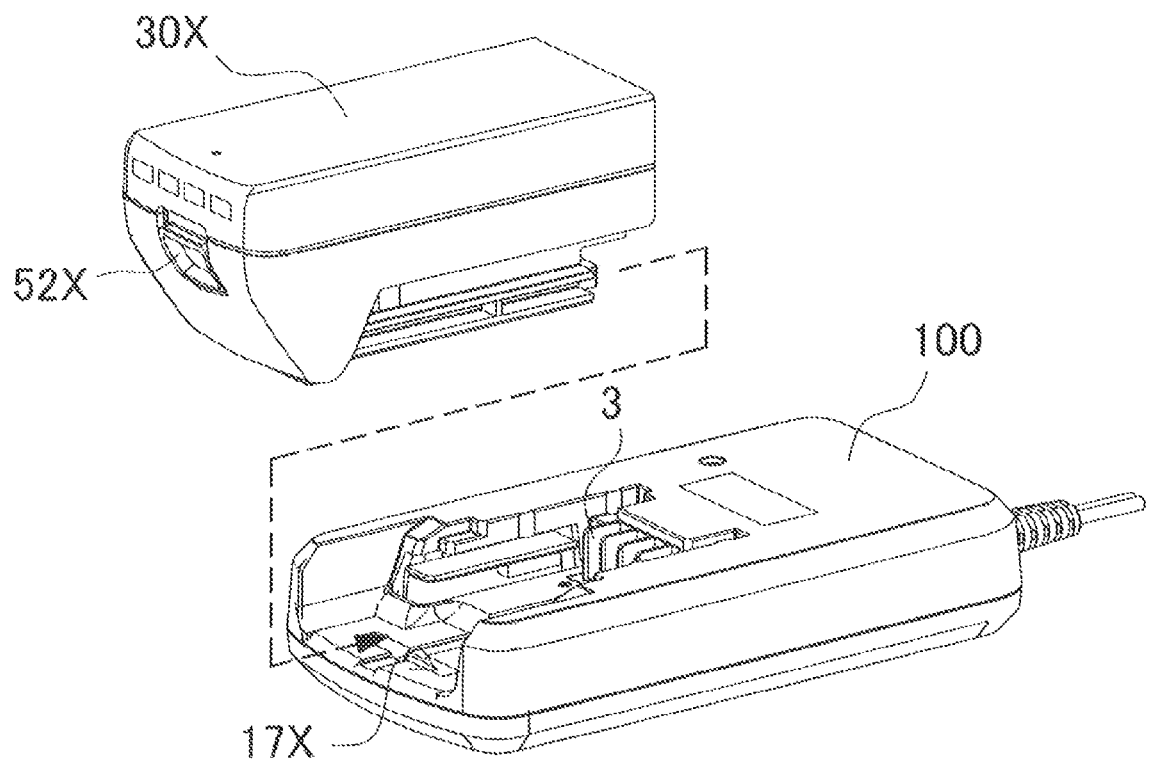
FIG. 31 is a perspective view showing a battery pack of the prior art installed in a battery pack charger.
Figure 32:
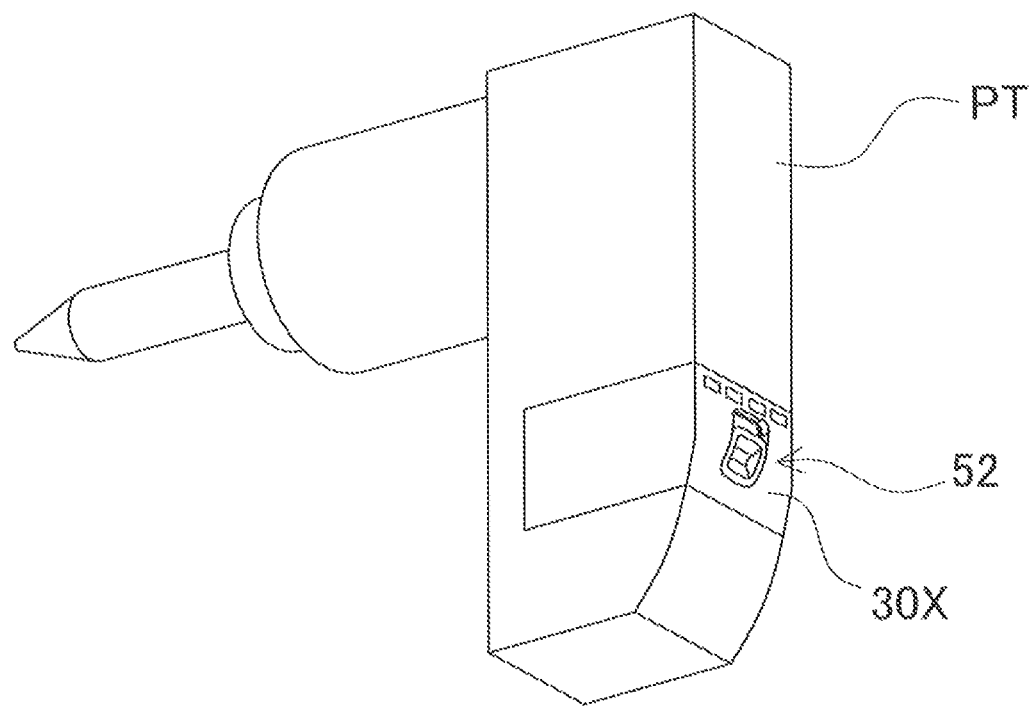
FIG. 32 is a perspective view showing a battery pack of the prior art installed in a power tool.
Figure 33:
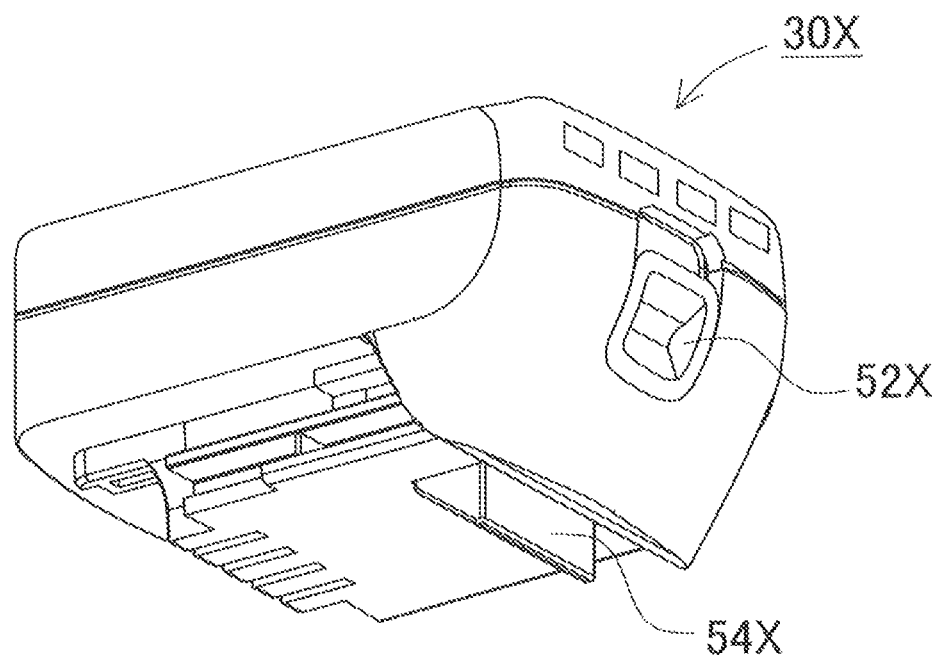
FIG. 33 is a perspective view of the battery pack in FIG. 31.

In this example, the LEDs 61 are provided directly on the detachment unit 52. However, the present example is not limited to this configuration. The display unit does not have to be provided on the detachment unit, and the light source for this display unit also does not have to be provided on the detachment unit. The battery pack 30C in the third example is shown in FIG. 28 through FIG. 30. FIG. 28 is an external perspective view showing the battery pack 30C in the third example. FIG. 29 is a front view of the battery pack 30 in FIG. 28. FIG. 30 is a vertical cross-sectional view from line XXIX-XXIX in FIG. 29.

In this example, the LEDs 61B are provided on the inside surface of the battery case 31 in a stationary position separate from the detachment unit 52. The light from the LEDs 61B is guided to the detachment unit 52 via a lamp leader 62. The lamp windows 57B serving as the display unit 56B and the LEDs 61B serving as the light source do not have to be arranged in the same location. They can be arranged in different positions and the light can be guided by a light guiding means such as a lamp leader 62.

As shown in the perspective view of FIG. 28 and the front view of FIG. 29, the battery pack 30C in the third example has an exposed latching unit 50B in which a display unit 56B is provided. As shown in the cross-sectional view of FIG. 30, the interior includes a battery holder 70 containing secondary battery 1 cells, a pack circuit board 74B secured to the upper surface of the battery holder 70, an operating switch 59B mounted on the upper surface of the pack circuit board 74B, LEDs 61B mounted on the lower surface of the pack circuit board 74B, and a lamp leader 62 for guiding light from the LEDs 61B to the rear surface of the display unit 56B.

(Lamp Leader 62)

The lamp leader 62 is arranged so the incident surface can be optically coupled with the LEDs 61B serving as the semiconductor light-emitting element. In this way, the LEDs 61B can be fixed in place and the light guided to a sliding display unit 56B. This lamp leader 62 can be made of a translucent resin. The lamp leader 62 is arranged so the exit surface of the LEDs 61B faces the incident surface while covering the outer peripheral surfaces of the LEDs 61B. The exit surface of the lamp leader 62 is arranged so that the light can be guided to the display unit 56B when the latching unit 50B is pushed down. Because, as shown in the front view of FIG. 29, there are four windows 57B in the display unit 56B, the LEDs 61B are mounted so as to correspond to these windows 57B. In other words, a total of four LEDs 61B are mounted on the bottom surface of the pack circuit board 74B. The lamp leader 62 has light-guiding paths for guiding the light of each LED 61B to its respective window 57B. In the example of FIG. 29, profiles of the secondary battery 1 cells are rendered surrounding the four windows 57B of the display unit 56B so the user can readily grasp the remaining capacity of the batteries from the windows 57B.

The latching unit 50B has a recessed detachment unit 52 in the surface, and the windows 57B are arranged in the bottom surface of the recess. The exit surface of the lamp leader 62 faces the underside of the windows 57B. The latching unit 50B can be slidably switched between the locked position and the unlocked position. In FIG. 30, the latching unit 50B is in the locked position. When no external force is applied, the latching unit 50B is pushed up to the locked position by a resilient component 67 such as a spring. When the user places a finger on the detachment unit 52 and pushes the latching unit 50B down against the resistance from the resilient component 67, the engaging hook 54B is pulled in from the pack battery surface and unlocked.

Because the latching unit 50B does not have LEDs or a subcircuit board for operating these LEDs, it does not require the placement of circuits on the moving components and flexible wiring is not required. Because the LEDs 61 are provided on the pack circuit board 74B in stationary positions, the circuit mounting for emitting light can be simplified and made more reliable. In the example shown in FIG. 29, the lamp leader 62 is also mounted in a stationary position. As a result, the latching unit 50B can be simplified and made more mechanically reliable.

(Operating Switch 59B)

By linking the operation of the operating switch 59B with the operation of the latching unit 50B in the battery pack 30C, the LED operating switch also serves to detach the battery pack. In other words, the operating switch 59B is not exposed on the outer surface of the battery pack 30C but is arranged inside the battery pack 30C, and the operating switch 59B is activated by operating the latching unit 50B. When the battery pack 30C is to be detached and the latching unit 50B is operated, the operating switch 59B is automatically pushed down, and the remaining capacity of the battery pack 30C is displayed. In this configuration, the user can check the remaining capacity of the battery pack 30C when the battery pack 30C is detached. For example, when a battery pack 30C is removed from a power tool, the user can check to see if the battery pack needs to be recharged. This encourages the user to place the removed battery pack 30C in the battery pack charger 100 so that the battery pack 30C always remains charged and has a sufficient remaining capacity. When the battery pack is attached and the power tool is being used, the user can check the remaining capacity by pushing down the latching unit 50B.

As shown in the cross-sectional view of FIG. 30, an operating switch 59B is arranged underneath the engaging hook 54B in the battery pack 30C so that the operating switch 59B, which is a push button, is pushed down when the engaging hook 54B is lowered. When the user manually pushes down the latching unit 50B against the biasing force of the resilient component 67, the operating switch 59B is pushed down by the underside of the engaging hook 54B. As a result, the remaining capacity of the battery is displayed by the illuminated pattern of the LEDs 61B in the display unit 56B shown in FIG. 29 in response to the operating switch 59B being turned ON. Afterwards, when the user manually releases the latching unit 50B, the latching unit 50B is pushed up by the biasing force of the resilient component 67, the operating switch 59B is turned OFF, and the LEDs 61B in the display unit 56B are turned OFF.

INDUSTRIAL APPLICABILITY

The battery pack of the present invention can be used as a battery pack for operating battery-operated machinery such as a power tool, or as a battery pack for operating mobile equipment and devices such as a motor-assisted bicycle, an electric bicycle, or a mobile phone.

What is claimed is:

1. A battery pack comprising:
at least one rechargeable secondary battery;
a battery case housing the rechargeable secondary battery;
a mounting mechanism for mechanically and detachably holding the battery case to a battery-powered device;
a pack circuit board; and
an electrical connection portion secured to the pack circuit board, wherein electrical power is supplied through the electrical connection portion to the battery-powered device when the electrical connection portion is electrically connected to the battery-powered device; and
wherein the battery case includes a first casing and a second casing connected to the first casing to form the battery case, and the pack circuit board is fixedly secured to an inside surface of the first casing,
wherein the electrical connection portion secured on the pack circuit board is exposed outside the first casing, and the mounting mechanism is installed so the mounting mechanism is at least partially exposed outside the first casing,
wherein the electrical connection portion is fastened to the first casing via the pack circuit board, and
wherein the first casing includes:
a first region through which at least a part of the mounting mechanism is exposed; and
a second region through which the electrical connection portion, being secured on the pack circuit board which is secured to the inside surface on the first casing, is exposed.

2. The battery pack according to claim 1, wherein the first casing has a column-shaped portion protruding from the inside surface of the first casing in an erect position and an insertion pin protruding from an edge of the column-shaped portion, the pack circuit board has a boss hole formed in a position corresponding to the insertion pin in a position secured on the inner surface of the first casing, and the pack circuit board is positioned with respect to the first casing by inserting the insertion pin of the column-shaped portion into the boss hole.

3. The battery pack according to claim 2, wherein a battery holder is provided having a plurality of secondary battery housing spaces for individually housing rechargeable secondary batteries, a boss for securing the pack circuit board is provided on an upper surface of the battery holder, the boss being provided in a position corresponding to the insertion pin with the battery holder housed in the battery case, a pin coupling unit is formed in an end surface of the boss to couple with the insertion pin, and the pack circuit board is interposed between the pin coupling unit and the insertion pin by coupling the insertion pin with the pin coupling unit when the insertion pin has been inserted into the boss hole of the pack circuit board.

4. The battery pack according to claim 1, wherein an electrical connection holder for holding the electrical connection portion is provided on the inner surface of the first casing.

5. The battery pack according to claim 4, wherein the electrical connection portion is a connector having a frame-shaped profile, and the electrical connection holder is a clamping rib clamping both sides of the connector.

6. The battery pack according to claim 4, wherein the electrical connection portion is an external connection terminal comprised of a bent metal plate, and the electrical connection holder is a terminal positioning rib clamping an upper edge of the external connection terminal.

7. The battery pack according to claim 1, wherein the mounting mechanism is an engaging hook protruding from the first casing, and insertable into a holding recess formed in a device to engage the holding recess.

8. The battery pack according to claim 7, wherein the mounting mechanism is a detachment unit for switching the engaging hook between a locked position protruding from the first casing and an unlocked position housed inside the first casing.

9. The battery pack according to claim 8, wherein the mounting mechanism is a latching unit having an integrally formed engaging hook and detachment unit, the detachment unit is slidably exposed on a surface of the first casing in a position other than that of the protruding engaging hook and the engaging hook is exposed on the surface of the first casing by sliding the detachment unit.

\* \* \* \* \*